(12) United States Patent
Hopkins et al.

(10) Patent No.: US 12,172,564 B2
(45) Date of Patent: Dec. 24, 2024

(54) MOBILE DELIVERY SYSTEM AND SMART CAROUSEL DISPENSER

(71) Applicant: Neapco Holdings LLC, Farmington Hills, MI (US)

(72) Inventors: Kenneth Lee Hopkins, Northville, MI (US); Paul Beringer Wilbur, West Bloomfield, MI (US)

(73) Assignee: Neapco Holdings LLC, Farmington Hills, MI (US)

( * ) Notice: Subject to any disclaimer, the term of this patent is extended or adjusted under 35 U.S.C. 154(b) by 759 days.

(21) Appl. No.: 17/329,653

(22) Filed: May 25, 2021

(65) Prior Publication Data

US 2022/0379793 A1 Dec. 1, 2022

(51) Int. Cl.
| | | |
|---|---|---|
| *B60P 3/00* | (2006.01) | |
| *B60J 5/04* | (2006.01) | |
| *B65G 1/04* | (2006.01) | |
| *G05B 19/04* | (2006.01) | |
| *G05B 19/042* | (2006.01) | |
| *G06K 7/10* | (2006.01) | |
| *G06Q 10/08* | (2024.01) | |
| *G01C 21/36* | (2006.01) | |

(52) U.S. Cl.
CPC ............ *B60P 3/007* (2013.01); *B60J 5/0497* (2013.01); *B65G 1/04* (2013.01); *G05B 19/042* (2013.01); *G06K 7/10445* (2013.01); *G06K 7/10861* (2013.01); *G06Q 10/08* (2013.01); *G01C 21/36* (2013.01); *G05B 2219/2637* (2013.01)

(58) Field of Classification Search
CPC ........... B60P 3/007; B60P 3/03; B60J 5/0497; B65G 1/04; B65G 1/133; G05B 19/042; G05B 2219/2637; G06K 7/10445; G06K 7/10861; G06Q 10/08; G01C 21/36; G01C 21/343
See application file for complete search history.

(56) References Cited

U.S. PATENT DOCUMENTS

| | | |
|---|---|---|
| 5,915,909 A | 6/1999 | Smith |
| 8,200,363 B2 | 6/2012 | Cook |
| (Continued) | | |

OTHER PUBLICATIONS

Three Different Examples of Track Structures (published or offered for sale prior to May 25, 2021) Source: Google Images.

(Continued)

*Primary Examiner* — Rodney A Butler
(74) *Attorney, Agent, or Firm* — Harness, Dickey & Pierce, PLC

(57) ABSTRACT

A mobile delivery apparatus is provided. Another aspect provides a software program used with a mobile delivery apparatus. Still another aspect includes a mobile delivery system utilizing a smart carousel dispenser. An aspect of the mobile delivery apparatus includes a delivery vehicle having a motor operable to drive terrestrial wheels of the delivery vehicle, a cargo box section, a carousel positioned in the cargo box section, and a plurality of storage bins positioned on the carousel. A further aspect includes at least one scanner positioned adjacent a first access door and configured to scan the bins and the parcels held in the bins as the carousel rotates. Yet another aspect employs a controller to rotate the carousel and selectively align one or more of the storage bins with a second access door.

42 Claims, 18 Drawing Sheets

(56) References Cited

U.S. PATENT DOCUMENTS

| | | |
|---|---|---|
| 10,611,570 B1 | 4/2020 | Washington |
| 2003/0105552 A1 | 6/2003 | Lunak et al. |
| 2005/0131645 A1 | 6/2005 | Panopoulos |
| 2006/0143038 A1* | 6/2006 | Sainsbury .............. G06Q 10/08 705/337 |
| 2008/0008568 A1 | 1/2008 | Harris et al. |
| 2011/0313811 A1 | 12/2011 | Urban et al. |
| 2013/0240673 A1 | 9/2013 | Schlosser et al. |
| 2017/0362033 A1 | 12/2017 | Mahfouz et al. |
| 2018/0195869 A1* | 7/2018 | High ................... G01C 21/3453 |
| 2018/0222620 A1 | 8/2018 | Lewis et al. |
| 2019/0066032 A1 | 2/2019 | Taveira et al. |
| 2019/0362295 A1 | 11/2019 | Kanitz |
| 2020/0279217 A1 | 9/2020 | Gravelle et al. |
| 2020/0324984 A1* | 10/2020 | Ohtsuka ................. G06Q 10/08 |
| 2020/0385210 A1 | 12/2020 | Montgomery |
| 2021/0188149 A1* | 6/2021 | Gonzalez ............... B60N 3/104 |
| 2022/0250527 A1* | 8/2022 | Lundeen .................... B60P 1/38 |
| 2022/0374834 A1* | 11/2022 | Lundeen ............... B60P 1/6409 |

OTHER PUBLICATIONS

Two Examples of Structural Elements (published or offered for sale prior to May 25, 2021) Source: Google Images.
Five Examples of Dampeners (published or offered for sale prior to May 25, 2021) Source: Google Images.
Four Examples of Storage Bins (published or offered for sale prior to May 25, 2021) Source: Google Images.
Three Examples of Carriers (published or offered for sale prior to May 25, 2021) Source: Google Images.
Six Examples of Attachment Elements (published or offered for sale prior to May 25, 2021) Source: Google Images.
Four Examples of Drive Motor Link Systems (published or offered for sale prior to May 25, 2021) Source: Google Images.
Three Examples of Drive Motors (published or offered for sale prior to May 25, 2021) Source: Google Images.

* cited by examiner

MOBILE DELIVERY SYSTEM AND SMART CAROUSEL DISPENSER

BACKGROUND

The present application relates generally to a mobile delivery system and more particularly to a mobile delivery system utilizing a smart carousel dispenser.

Mobile delivery systems that utilize a carousel are generally known. A rotatable carousel mounted in a delivery vehicle is described in U.S. Patent Publication No. 2019/0362295 entitled "Automated Delivery Systems for Autonomous Vehicles" filed on Jul. 17, 2018; U.S. Patent Publication No. 2011/0313811 entitled "Mobile Retail Store Structure with Inventory System" filed Nov. 11, 2010; and U.S. Pat. No. 8,200,363 entitled "Transport Trailer and Method" filed on May 8, 2009. These patent applications and patents are all incorporated by reference herein.

SUMMARY

In accordance with the present invention, a mobile delivery apparatus is provided. Another aspect provides a software program used with a mobile delivery apparatus. Still another aspect includes a mobile delivery system utilizing a smart carousel dispenser.

An aspect of the mobile delivery apparatus includes a delivery vehicle having a motor operable to drive terrestrial wheels of the delivery vehicle, a cargo box section, a carousel positioned in the cargo box section, and a plurality of storage bins positioned on the carousel. An additional aspect includes a first access door positioned at a rear portion of the cargo box section and a second access door positioned at a side portion of the cargo box section. A further aspect includes at least one scanner positioned adjacent the first access door and configured to scan parcels held in the storage bins as the carousel rotates. Yet another aspect employs a controller to rotate the carousel and selectively align one or more of the storage bins with the second access door.

In another aspect of a mobile delivery apparatus, the apparatus includes a carousel configured to rotate a plurality of storage bins about a vertical axis. The storage bins are also configured to hold a plurality of parcels for delivery. An additional aspect of the apparatus includes a controller configured to receive parcel information and bin information associated with the storage bins and parcels, assign each parcel a bin location on the carousel based on the parcel information and the bin information, receive a delivery location associated with each parcel, and receive a delivery route. In a still further aspect, the controller is configured to rotate the carousel, determine the bin location of a specified parcel along the delivery route, and stop rotation of the carousel to selectively align one of the storage bins holding the specified parcel at a retrieval position based on the bin location prior to arriving at the delivery location of the specified parcel.

In yet another aspect, the present apparatus comprises storage bins configured to hold articles, an upper track configured to support a top portion of the storage bins, and a lower track configured to support a bottom portion of the storage bins. An additional aspect employs a DC drive motor configured to rotate the storage bins between the upper track and the lower track. In a further aspect, the apparatus includes a frame to which the upper track and the lower track are coupled, a first set of dampeners positioned on an upper portion of the frame, and a second set of dampeners positioned on a lower portion of the frame.

In accordance with another aspect, the present software program includes a set of instruction receiving an indicia input signal from a sensor wherein the indicia input signal comprising parcel indicia associated with each parcel. An additional aspect of the software program includes a set of instructions associating the parcel indicia with a carousel location and a set of instructions receiving a delivery route based on a delivery location associated with each parcel from an external source. A further aspect of the software program includes a set of instruction identifying the carousel location of a parcel to be delivered along the delivery route and a set of instructions activating a driving motor of the carousel to position the parcel to be delivered in a retrieval position prior to arriving at the delivery location.

In another aspect, the present method includes loading parcels into a plurality of storage bins of a rotatable carousel, reading bin identification information associated with each storage bin as the carousel rotates, and reading parcel information associated with each parcel loaded into the storage bins as the carousel rotates. A further aspect includes associating the parcel information with the bin identification information and assigning a bin location on the carousel to each parcel. In yet a further aspect, the bin location of a parcel to be delivered along a delivery route is identified and the carousel is rotated to position the parcel to be delivered in front of a retrieval door prior to arriving at the parcel's delivery location. In another aspect, the bin location of the parcel to be delivered is sent to and displayed on an external device.

The present systems, apparatuses, software, and methods are advantageous over prior constructions. For example, the present systems, apparatuses, software, and methods allow for efficient loading, unloading, and delivery of parcels. The present systems, apparatuses, software, and methods also enable a delivery vehicle to make less stops and reduce the time spent at each stop. For example, a delivery person is able to easily locate and retrieve an item for delivery, thereby spending less time at each stop. Additionally, scanners positioned within the delivery vehicle enable a delivery person to quickly identify the location of each parcel within the delivery vehicle itself, such as a specific storage bin or shelf location.

The present systems and apparatuses also prevent damage to parcels and the carousel itself by accommodating for shock, impact, and vibrations that occur during transit. For example, parcels and mechanisms associated with the carousel are prevented from shifting as the vehicle turns and experiences bumpy roads, making the delivery vehicle suitable for us in various conditions, such as freezing and hot temperatures. The present systems, apparatuses, and software also communicate with a warehouse's controller and software and external devices, such as a PDAs, for parcel tracking and automating parcel deliveries. Moreover, the present apparatus is lighter and more compact than conventional carousels, reducing manufacturing costs and fuel costs. Additional advantages and features will be disclosed in the following description and claims as well as in the appended drawings

DETAILED DESCRIPTION

Figure 1:
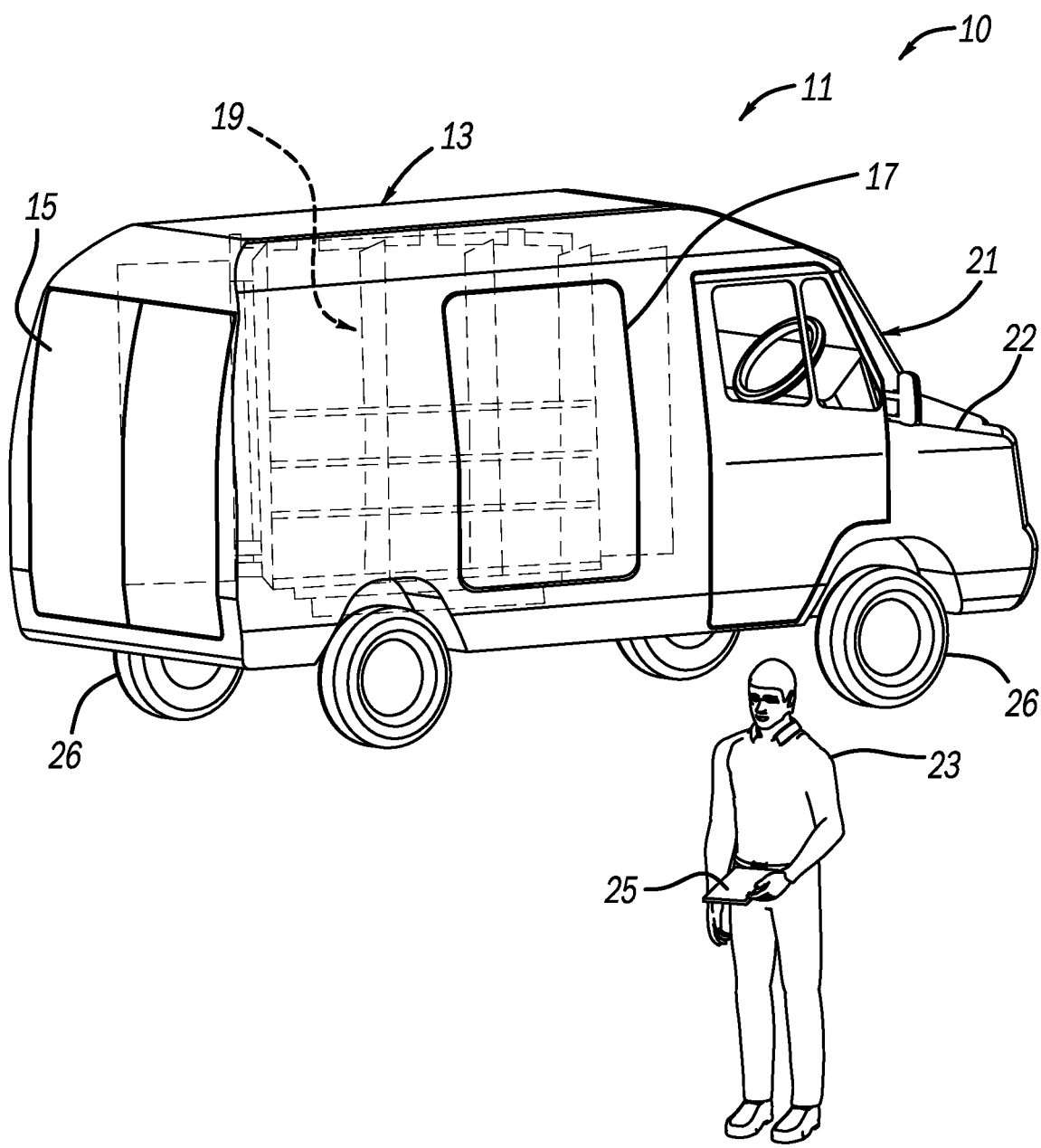
FIG. 1 is a perspective view showing a first embodiment of the present mobile delivery system utilizing a smart carousel dispenser.

A first embodiment of a mobile delivery system or apparatus 10 is illustrated in FIG. 1. Delivery system 10 includes a delivery vehicle 11 having a cargo box section, such as a box section 13, a passenger compartment 21 and an engine compartment 22. Engine compartment 22 includes an internal combustion or electric motor and transmission for driving terrestrial wheels 26 associated with delivery vehicle 11. Passenger compartment 21 includes a cabin for a user, such as a delivery person 23, to operate delivery vehicle 11. A carousel 19 is located within delivery vehicle 11.

Delivery system 10 also includes a hand-held and portable external personal digital assistant ("PDA") 25 configured to be operated by delivery person 23 and communicate instructions to and from carousel 19 positioned within box section 13 of delivery vehicle 11. PDA 25 includes a programmable controller, RAM or ROM memory, input buttons or touch screen, output lights or a display screen, a power supply such as a rechargeable battery, a global position system ("GPS") locator, and a wireless communicator.

Box section 13 of delivery vehicle 11 includes a rear access door 15 and at least a side access door 17. Carousel 19 is positioned within box section 13 and is loaded through rear access door 15. Carousel 19 is unloaded through side access door 17. The access doors are pivoting, sliding or rolling to expose door openings through which a loader person or robot, and delivery person 23, are able to access parcels on carousel 19.

Figure 2:
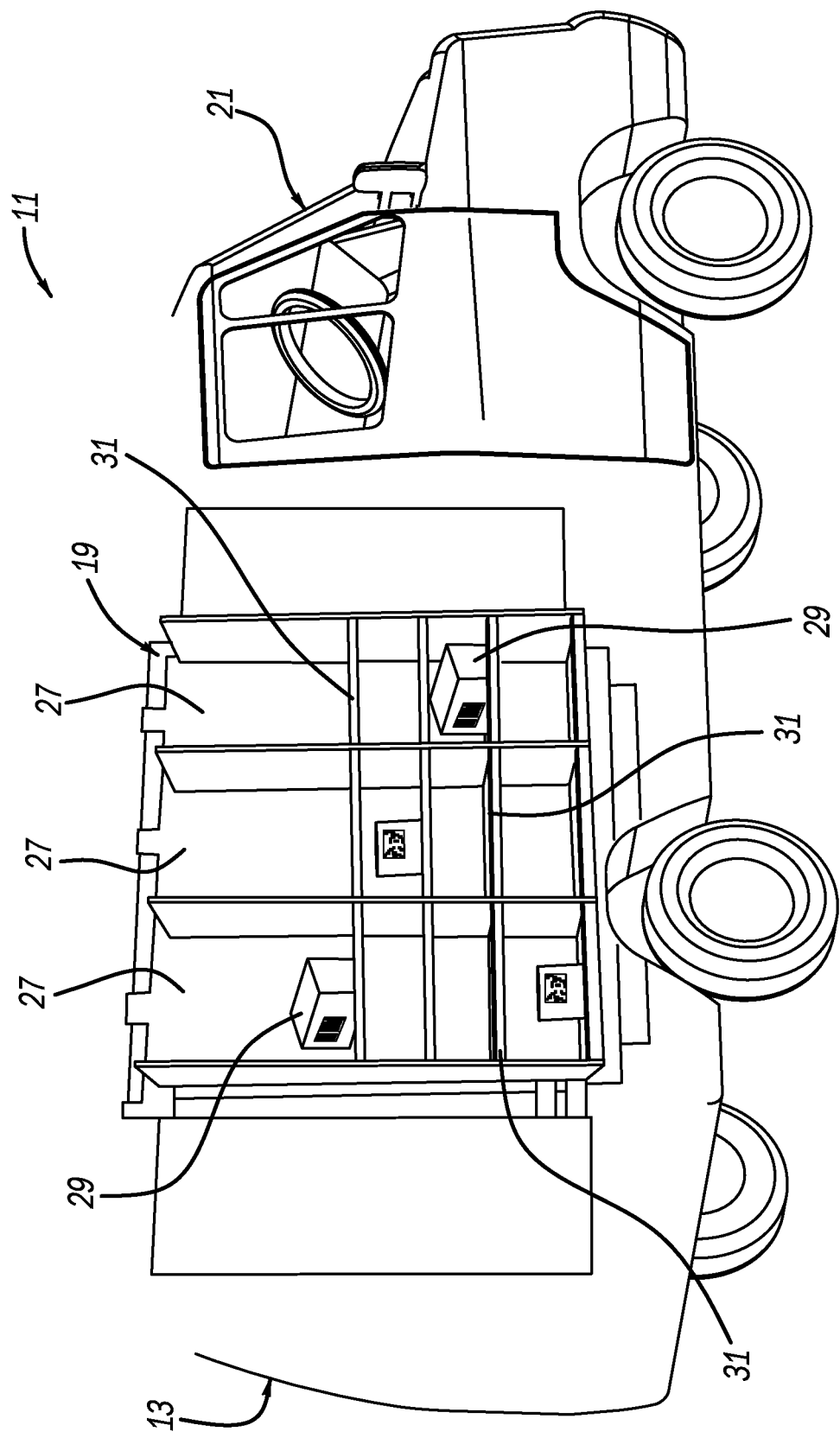
FIG. 2 is a fragmentary perspective view showing the present system.
Figure 3:
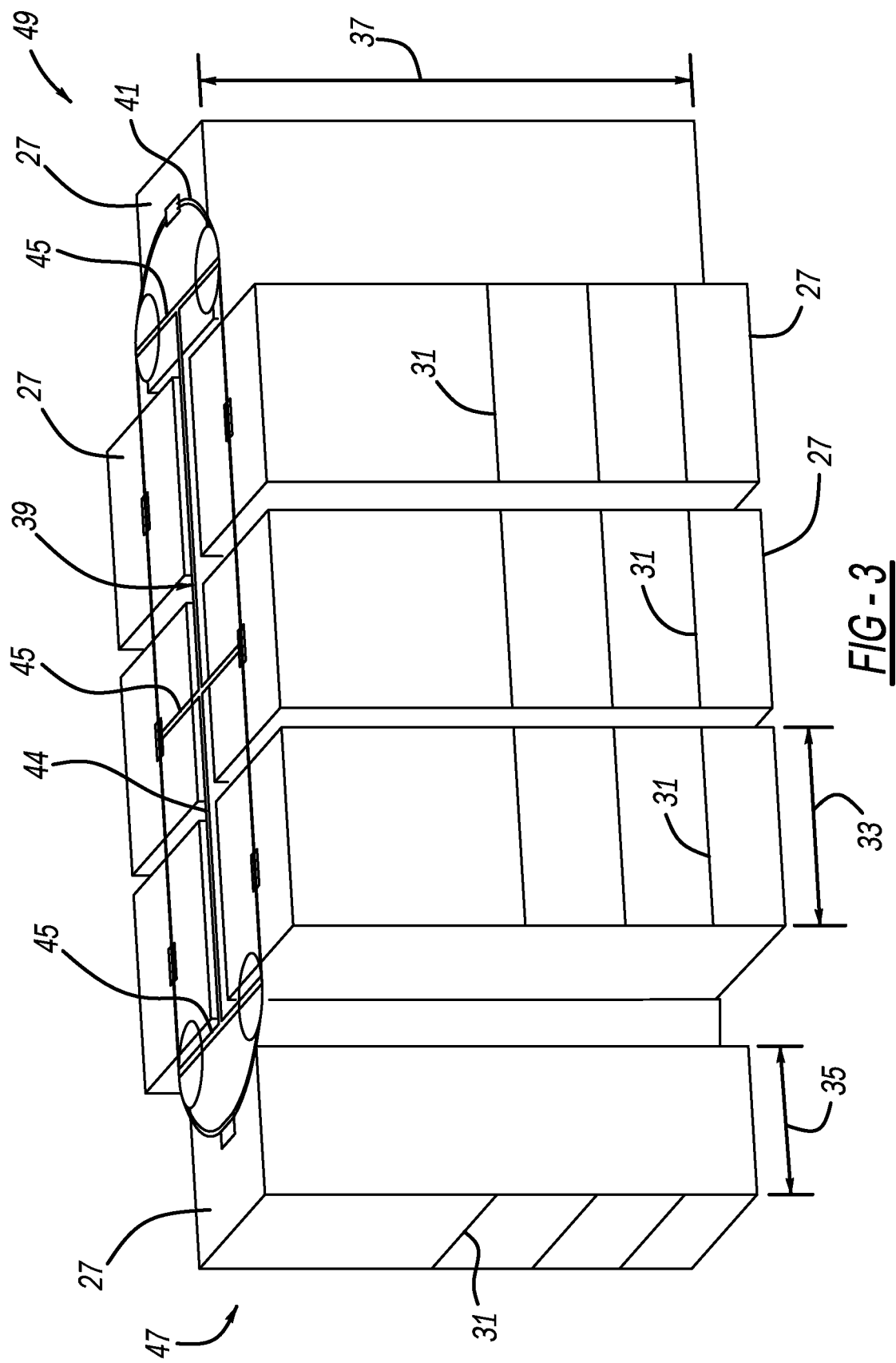
FIG. 3 is a diagrammatic perspective view of the carousel of the present system.

Referring to FIGS. 2 and 3, carousel 19 includes a plurality of storage bins 27 configured to hold a plurality of items, such as a plurality of parcels 29, for delivery to a specified location. In some embodiments, bins 27 comprise a polymeric material. In other embodiments, bins 27 may comprise a wire mesh material. In still other embodiments, bins 27 may comprise an 18 gauge or less steel.

As shown in FIG. 3, an exemplary version of carousel 19 may include eight bins 27. Additionally, each bin 27 comprises a width 33, a depth 35, and height 37 in a preferred by non-limiting version. In some embodiments, width 33 is about 24 inches and depth 35 is about 24 inches. In some embodiments, height 37 may be equal to or less than about 84 inches. The number of bins 27, width 33, depth 35, and height 37 may be adjusted to suit a particular purpose, such as a particular size and shape of box section 13 of delivery vehicle 11.

Each bin 27 includes a plurality of shelves 31 for holding parcels 29. For example, each bin 27 may include three vertically spaced apart shelves 31, as shown in FIG. 3. In some embodiments, each shelf 31 may be configured to hold up to about 100 pounds. Shelves 31 may also be adjustable to accommodate various sizes of parcels 29. For example, each shelf 31 may be adjusted by about 2-inch increments within each bin 27.

Parcels 29 are placed on shelves 31 with an indicia on each parcel outwardly facing so that at least one of scanners 63 can read the indicia as carousel 19 rotates. In some additional embodiments, each shelf 31 in bins 27 includes a lip, as shown in FIG. 4, to deter parcels 29 from sliding and falling off shelves 31 as delivery vehicle 11 travels along bumpy roads and turns corners.

Figure 4:
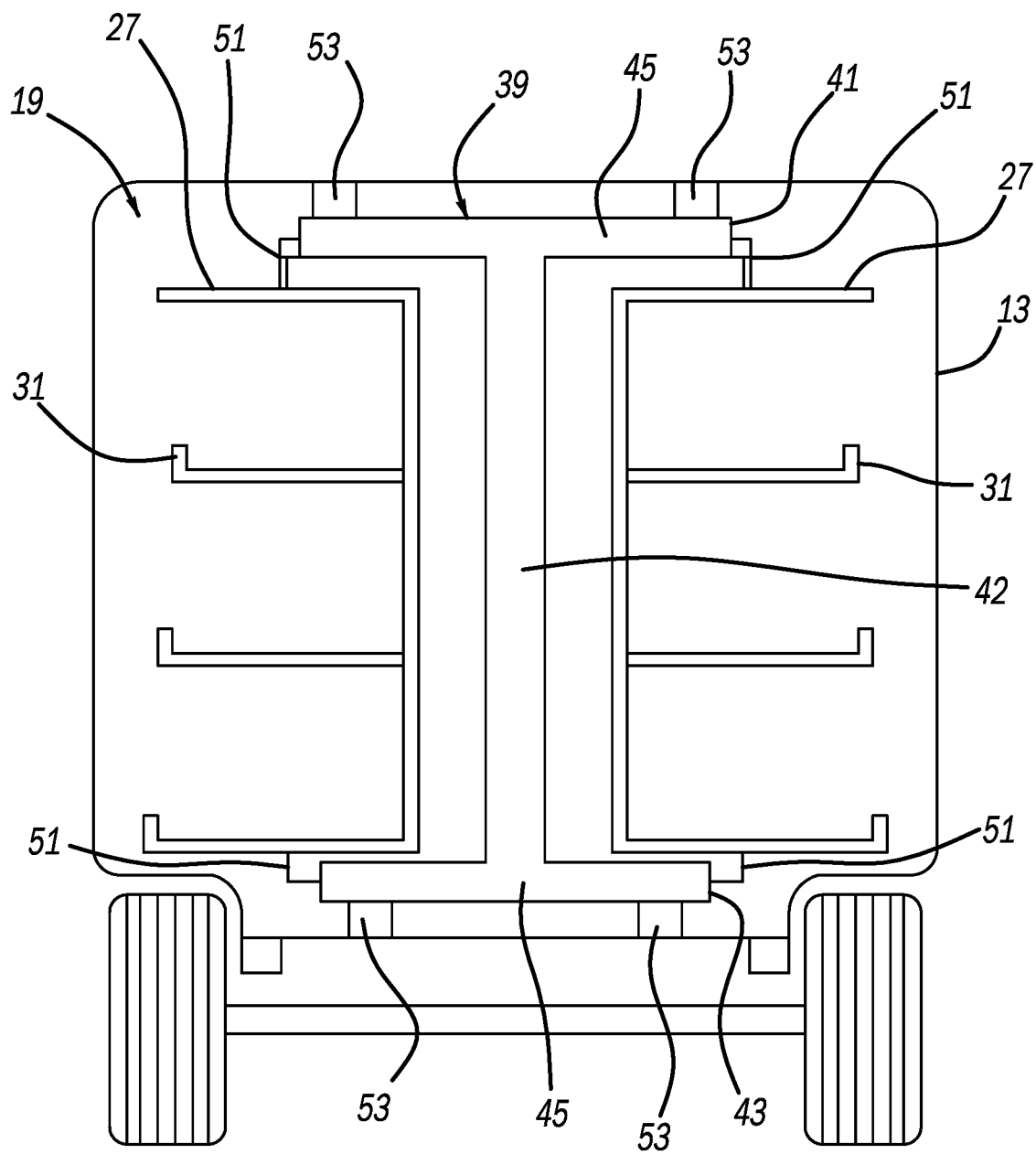
FIG. 4 is a diagrammatic rear view of the carousel of the present system.

With reference to FIGS. 3 and 4, carousel 19 includes a frame 39 for supporting bins 27 and mounting carousel 19 in box section 13 of delivery vehicle 11. Frame 39 includes a center support member 42 and one or more horizontal beams 44 coupled to center support member 42. For example, one of the horizontal beams 44 is coupled to center support member 42 at a top portion of carousel 19 and another one of the horizontal beams 44 is coupled to center support member 42 at a bottom portion of carousel 19. Each horizontal beam 44 extends from a first end 47 of carousel 19 to a second end 49 of carousel 19. Frame 39 also includes one or more cross-beams 45 coupled to horizontal beams 44 and perpendicular to horizontal beams 44. In some embodiments, frame 39 is configured to support at least 4,000 pounds.

Frame 39 additionally includes a first track 41 coupled to one or more cross-beams 45 at the top portion of carousel 19 and a second track 43 coupled to one or more cross-beams 45 at the bottom portion of carousel 19. Cross-beams 45, horizontal beams 44, and center support member 42 are configured to support first track 41 and second track 43. In some embodiments, first track 41 and second track 43 have an ovular shape. For example, each of the bins 27 are coupled to first track 41 and second track 43 and are configured to rotate about a radius of first track 41 and second track 43 while an adjacent one of the bins 27 is linearly moving along a straight track portion of first track 41 and second track 43.

Figure 5A:
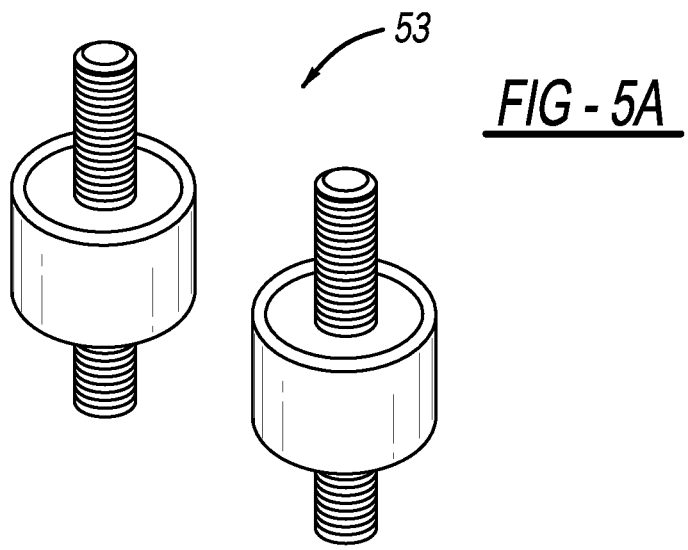
FIG. 5A is a perspective view of a first embodiment dampener employed the present system.
Figure 5B:
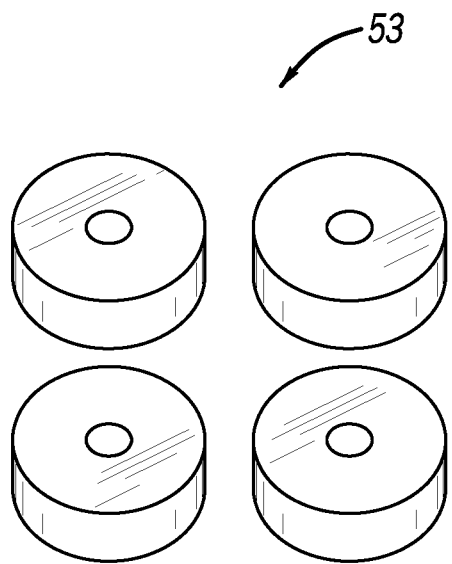
FIG. 5B is a perspective view of a second embodiment dampener of the present system.
Figure 5C:
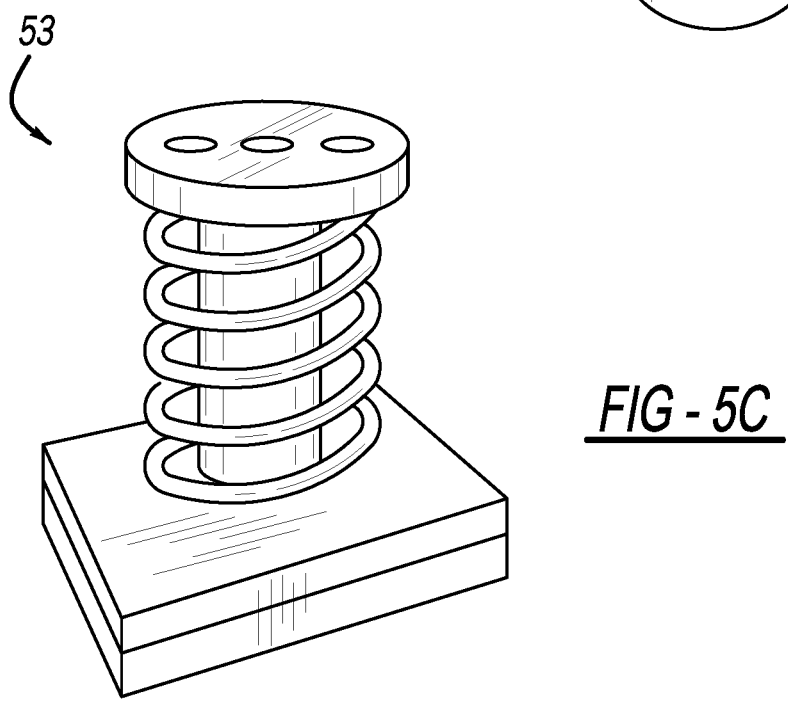
FIG. 5C is a perspective view of a third embodiment dampener of the present system.
Figure 5D:
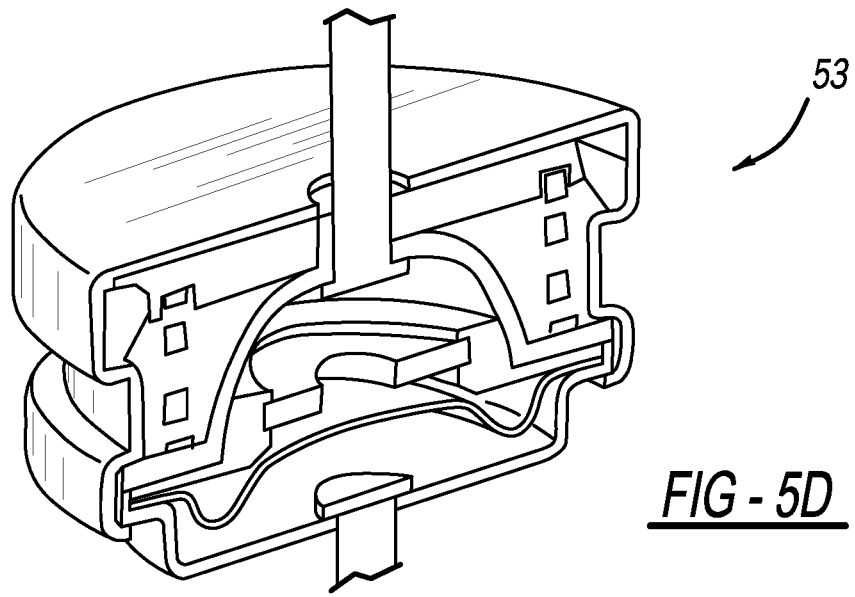
FIG. 5D is a fragmentary perspective view of a fourth embodiment dampener of the present system.

Referring to FIG. 4, carousel 19 includes a plurality of dampeners 53 coupled to frame 39. For example, a first set of dampeners 53 are coupled to frame 39 at the top portion of carousel 19 and a second set of dampeners 53 are coupled to frame 39 at the bottom portion of carousel 19. The first set of dampeners 53 are also coupled to a roof portion of box section 13, such as structural roof bows or side rails, and the second set of dampeners 53 are also coupled to a floor portion of box section 13. In other embodiments, dampeners 53 may be coupled to horizontal beam 44 at the top portion and the bottom portion of carousel 19. Additionally or alternatively, dampeners 53 may be coupled to one or more cross-beams 45 at the top portion and the bottom portion of carousel 19. In some embodiments, dampeners 53 comprise rubber bushing, as shown in FIG. 5A and FIG. 5B. In other embodiments, dampeners 53 may comprise a spring, as shown in FIG. 5C. In still other embodiments, dampeners 53 may comprise a hydro-elastic dampener, as shown in FIG. 5D. Dampeners 53 advantageously reduce vibration and impact shock between the moving delivery vehicle 11 and carousel 19 to lessen fatigue on the carousel mechanisms and to deter parcels 29 from falling out of bins 27.

Figure 6A:
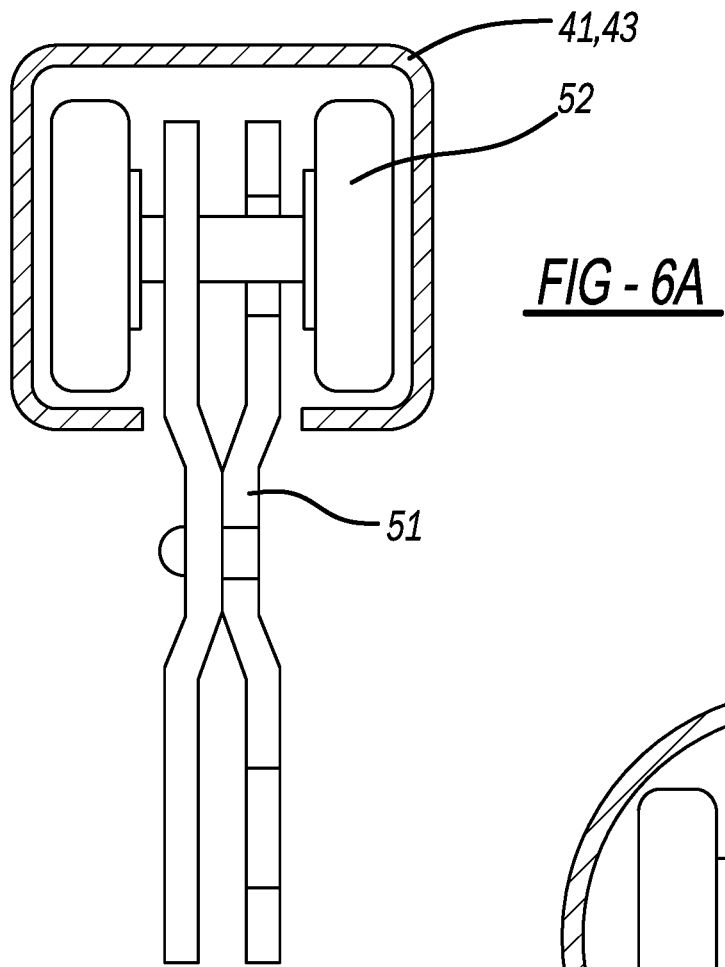
FIG. 6A is a cross-section of a first embodiment track and attachment bracket of the present system.
Figure 6B:
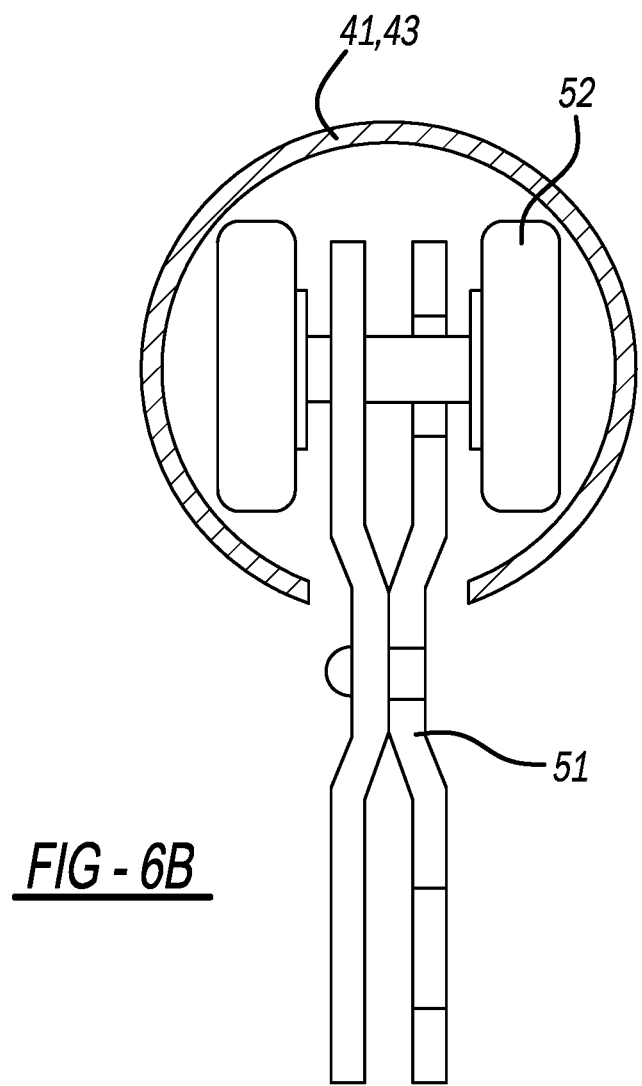
FIG. 6B is a cross-section of a second embodiment track and attachment bracket of the present system.

With reference to FIGS. 4, 6A, and 6B, each bin 27 is configured to be coupled to first track 41 and second track 43 by one or more attachment brackets 51. In some embodiments, attachment brackets 51 include hooks configured to attach each bin 27 to frame 39 of carousel 19. For example, a top of each bin 27 may be attached to first track 41 by one or more attachment brackets 51 and a bottom of each bin 27 may be attached to second track 43 by one or more attachment brackets 51. In some embodiments, attachment brackets 51 are attached at a center portion of the top and the bottom of each bin 27.

In some embodiments, first track 41 and second track 43 comprise a hollow tube. For example, first track 41 and second track 43 comprise a round, hollow tube, as shown in FIG. 6A. In other embodiments, first track 41 and second track 43 may comprise a rectangular, hollow tube, such as shown in FIG. 6B. Attachment brackets 51 may be coupled to a wheel 52 configured to be positioned within first track 41 and second track 43, as shown in FIGS. 6A and 6B. Wheel 52 of each attachment bracket 51 is configured to move along first track 41 and second track 43, thereby also moving each bin 27 along first track 41 and second track 43. In some embodiments, attachment brackets 51 are coupled to a tape drive within first track 41 and second track 43. The tape drive is configured to move attachment brackets 51, and thereby bins 27, along first track 41 and second track 43. In other embodiments, attachment brackets 51 may be coupled to a chain positioned within first track 41 and second track 43 for moving bins 27 along first track 41 and second track 43.

Figure 7:
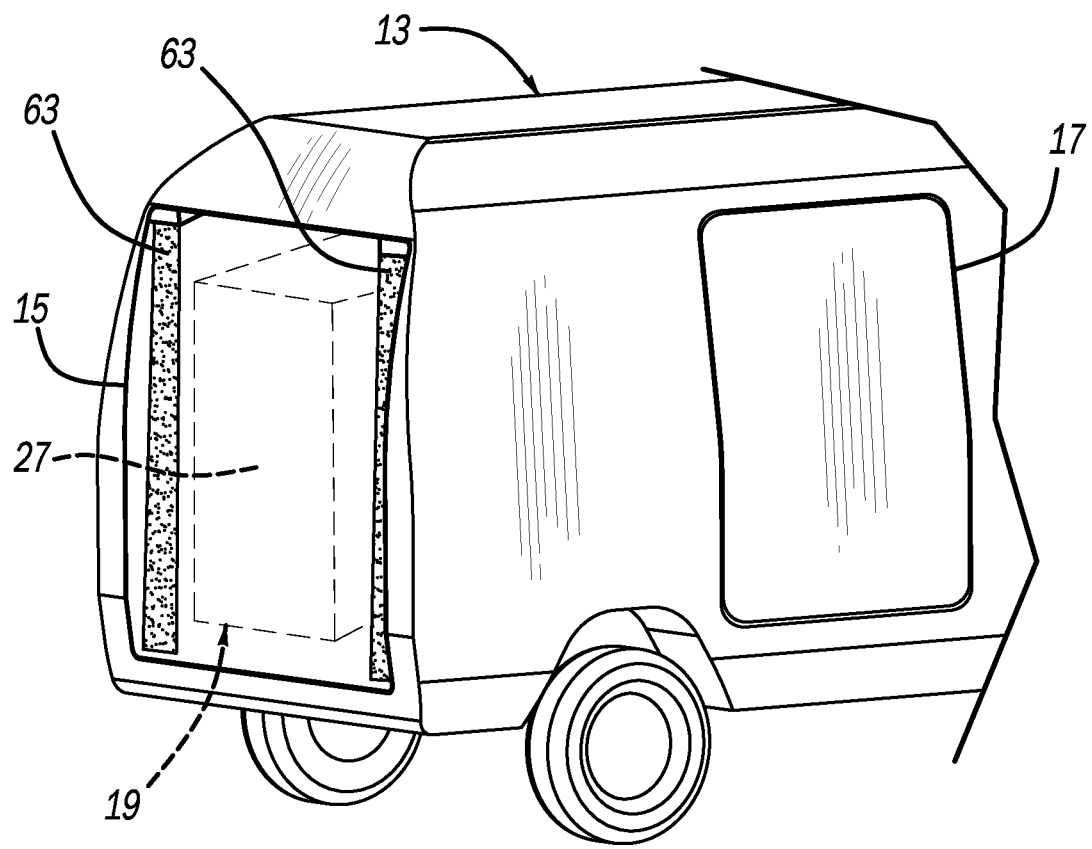
FIG. 7 is a fragmentary and rear perspective view showing scanners and the carousel unit inside the delivery vehicle of the present system.
Figure 8:
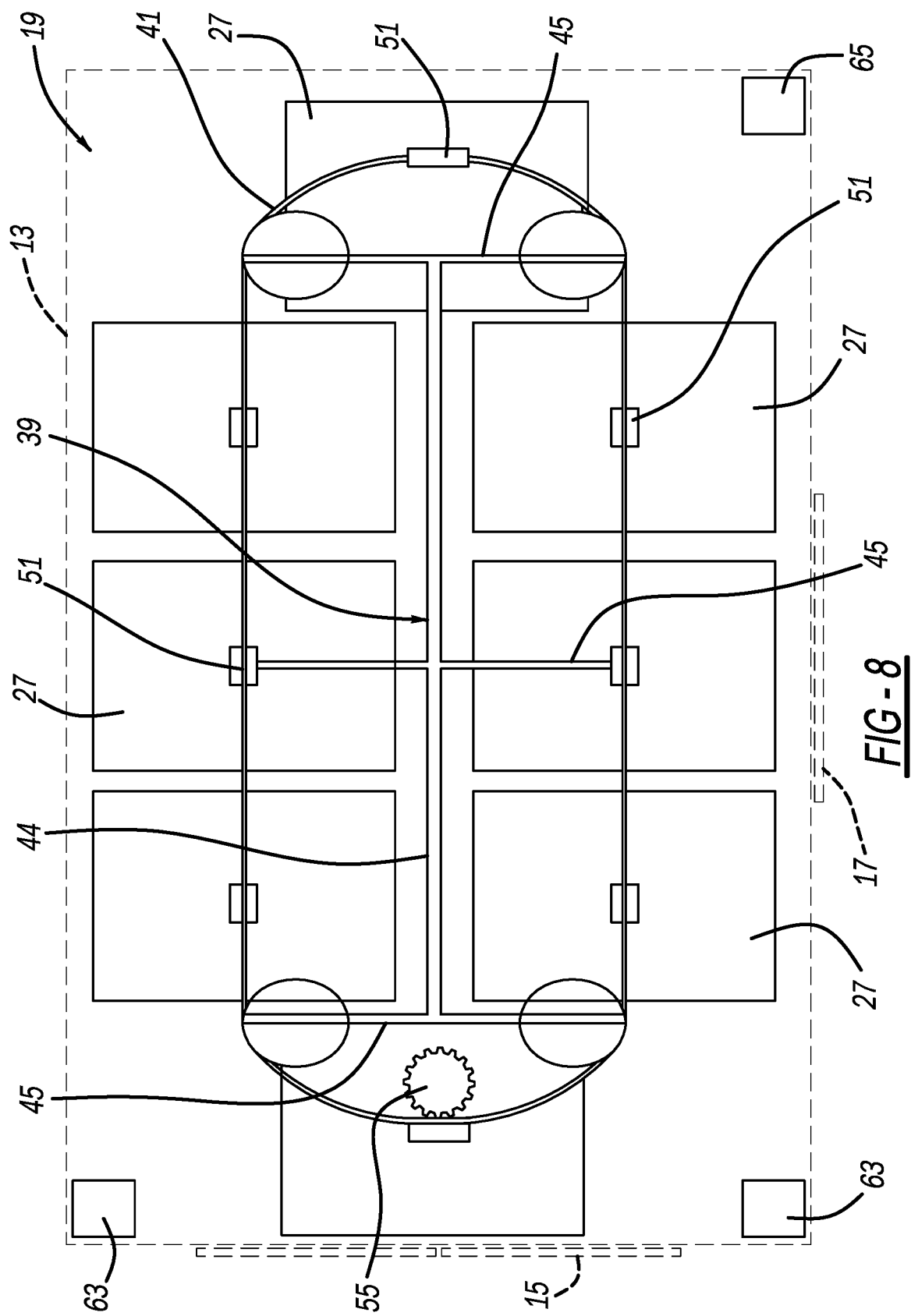
FIG. 8 is a bottom view of the present system.

Referring to FIGS. 7 and 8, delivery system 10 additionally includes one or more scanners 63 positioned in box section 13. In some embodiments, one or more scanners 63 are coupled to an interior portion of box section 13 adjacent rear access door 15. For example, a first scanner of scanners 63 may be attached to box section 13 adjacent rear access door 15 and a second scanner of scanners 63 may be attached to box section 13 adjacent side access door 17 and opposite the first scanner. In some embodiments, scanners 63 are vertically elongated and extend from the roof portion of box section 13 to the floor portion of box section 13. Scanners 63 are configured to scan bins 27 and parcels 29 positioned in bins 27 as bins 27 rotate. In some embodiments, scanners 63 may comprise one or more of optical scanners, RFID scanners, barcode readers, and/or QR code readers.

With reference to FIG. 8, carousel 19 additionally includes a drive motor 55 configured to move bins 27 about first track 41 and second track 43 in one or both of a clockwise and counter-clockwise direction. For example, drive motor 55 moves bins 27 in a first direction, such as a clockwise direction, then may reverse to an opposite direction, such as a counter-clockwise direction. In some embodiments, drive motor 55 is a DC motor. Drive motor 55 is configured to continuously rotate bins 27 of carousel 19 at a low speed. For example, carousel 19 may rotate at a speed of about 10 feet/minute to about 60 feet/minute, but preferably at a speed of about 40 feet/minute.

In some embodiments, drive motor 55 is configured to be attached to second track 43, as shown in FIG. 9. For example, drive motor 55 is attached to second track 43 at first end 47 of carousel 19. In other embodiments, drive motor 55 may be attached to second track 43 at second end 49 of carousel 19. In still other embodiments, drive motor 55 may be attached to second track 43 at a center of carousel 19. Additionally or alternatively, carousel 19 may include another one or more drive motors 55 attached to second track 43 and/or first track 41.

Figure 9A:
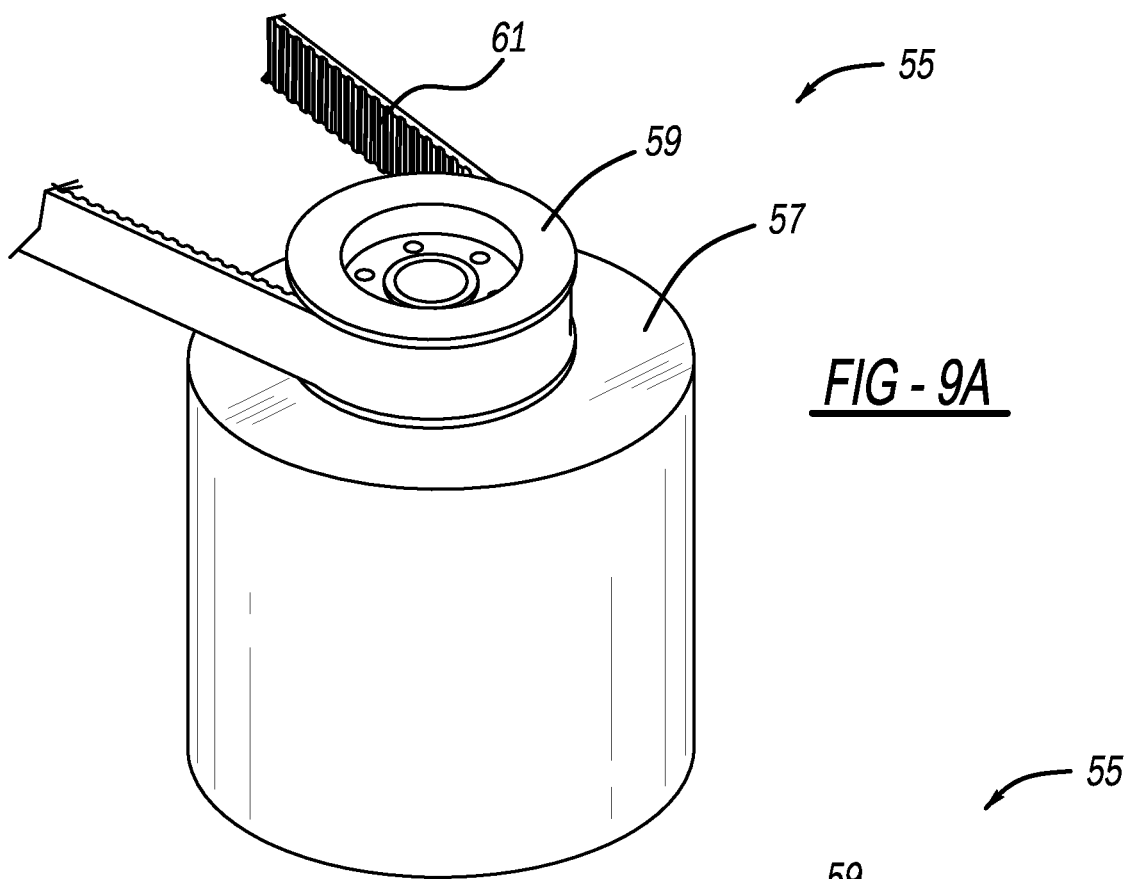
FIG. 9A is a perspective view of a first embodiment drive motor and transmission of the present system.
Figure 9B:
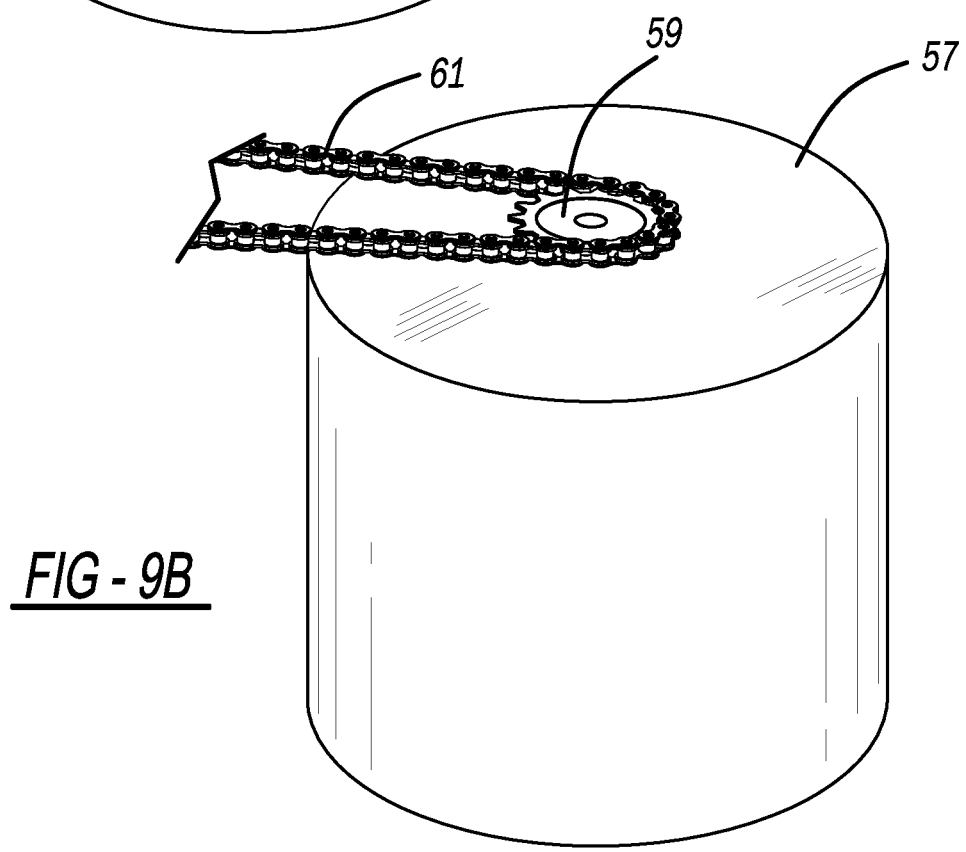
FIG. 9B is a perspective view of a second embodiment drive motor and transmission of the present system.
Figure 9C:
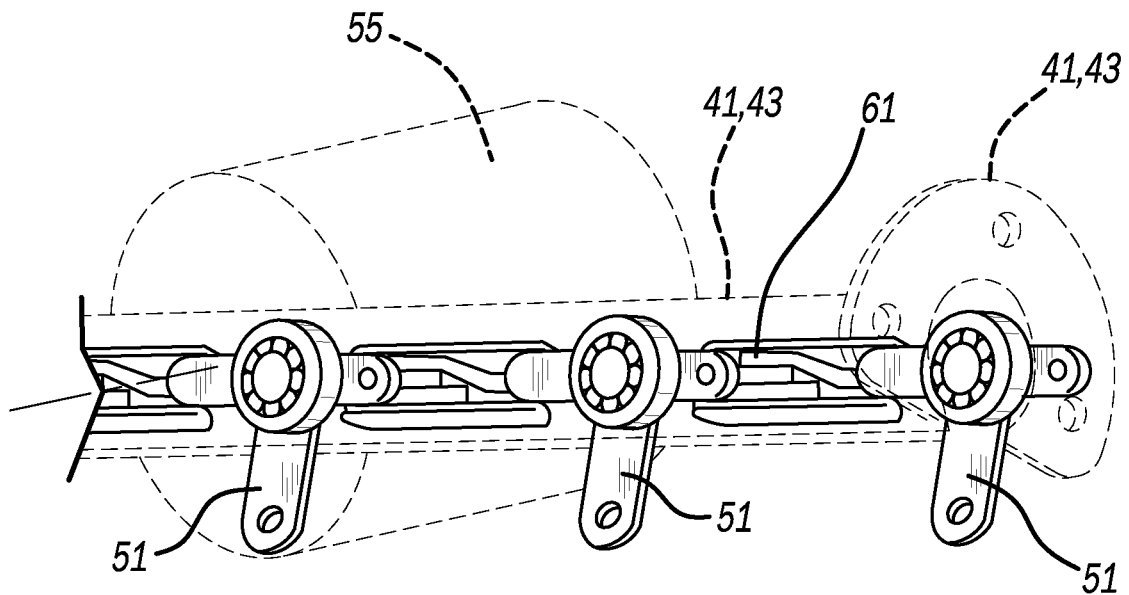
FIG. 9C is a perspective view of the drive motor and transmission of the present system.

With reference to FIGS. 9A, 9B, and 9C, drive motor 55 may include a sprocket 57 and a cog 59 coupled to sprocket 57. As shown in FIG. 9A, cog 59 is configured to engage a drive belt 61 positioned at least within second track 43. When drive motor 55 is activated, sprocket 57 and cog 59 are configured to rotate. Cog 59, which is engaged with drive belt 61, causes drive belt 61 to move. Drive belt 61 rotates about cog 59 and therefore moves bins 27 along first track 41 and second track 43. In some embodiments, drive belt 61 may be a tape drive, as shown in FIG. 9A. In other embodiments, drive belt 61 may be a chain, as shown in FIG. 9B. In still other embodiments, drive belt 61 may be a complex chain, as shown in FIG. 9C. As additionally shown in FIG. 9C, attachment brackets 51 may be coupled directly to drive belt 61, such as the complex chain, positioned within first track 41 and/or second track 43.

Referring again to FIG. 8, delivery system 10 also includes a computer processing unit ("CPU"), such as a programmable controller 65, positioned in box section 13. In some embodiments, controller 65 is positioned in box section 13 adjacent side access door 17. Controller 65 includes a microprocessor, RAM and/or ROM memory, and a wireless communications transmitter and receiver. Controller 65 is configured to control the operation of carousel 19, communicate with the warehouse depot controller, and communicate with the PDA. For example, controller 65 is configured to receive data signals from scanners 63 and control operation of drive motor 55. Data received by controller 65 from scanners 63 includes parcel indicia and bin indicia associated with each bin 27 and each parcel 29 loaded in bins 27 of carousel 19. Controller 65 is configured to rotate carousel 19, if necessary, so that one or more parcels 29 stored within a specified bin of bins 27 is rotated to a retrieval position, such as in front of side access door 17, prior to arriving at the specified parcel's delivery location. In other embodiments, delivery system 10 additionally includes a manual switch for operating carousel 19.

In some embodiments, box section 13 includes a sensor communicatively coupled to controller 65 and positioned adjacent side access door 17 for sensing when one or more parcels 29 are removed through side access door 17. Additionally, or alternatively, box section 13 includes one or more position switches configured to monitor the position of bins 27 on carousel 19. For example, at least one position switch may be positioned adjacent side access door 17 of box section 13.

Figure 10:
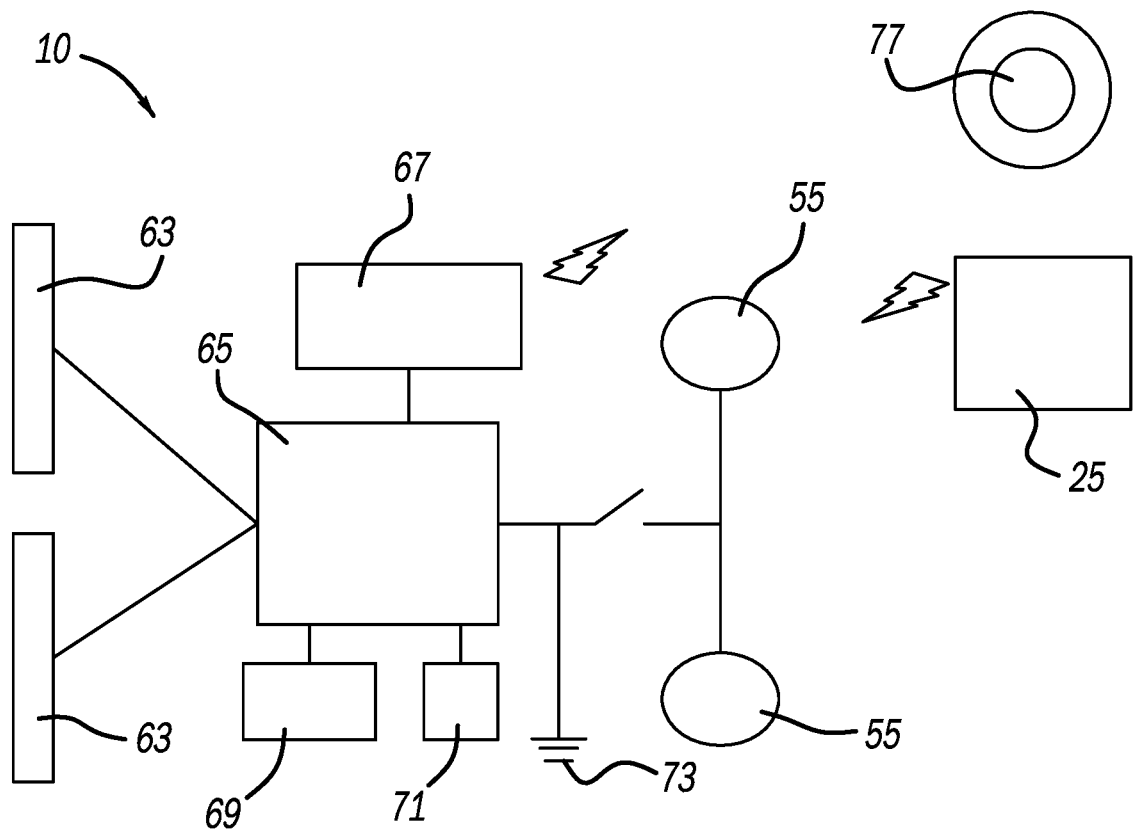
FIG. 10 is a circuit diagram of the present system.

FIG. 10 is a circuit diagram illustrating additional features of delivery system 10. Delivery system 10 includes controller 65 communicatively coupled to one or more drive motors 55, scanners 63, a transmitter and receiver 67, an input and output 69, and a power source 73. Controller 65 receives data from scanners 63. For example, controller 65 receives parcel indicia for each parcel 29 and bin indicia for each bin 27 from scanners 63. Controller 65 is configured to associate the parcel indicia and the bin indicia. In some embodiments, controller 65 is also configured to assign a bin location to each parcel 29.

Controller 65 is also configured to receive a delivery route for delivering each parcel 29. For example, controller 65 receives the delivery route from external device 25 via transmitter and receiver 67. In some embodiments, external device 25 communicates with transmitter and receiver 67 via Bluetooth. Additionally or alternatively, external device 25 communicates with transmitter and receiver 67 via Wi-Fi. Controller 65 determines the bin location of a specified parcel of parcels 29 to be delivered along the delivery route. Based on the bin location of the specified parcel, controller 65 supplies power from power source 73 to one or more drive motors 55 to rotate carousel 19 and position at least one bin 27 containing the specified parcel at the retrieval position, such as in front of side access door 17, prior to delivery vehicle 11 arriving at the delivery location. In some embodiments, power source 73 comprises a battery positioned in delivery vehicle 11. In other embodiments, power source 73 comprises the same power source supplying power to delivery vehicle 11, such as the electric traction driving motor(s) in an electric, hybrid, or autonomous powered automobile. For example, a battery and/or its electric traction driving motor may synergistically and multi-functionally supply power to both delivery vehicle 11 and carousel 19.

In some additional embodiments, controller 65 transmits the bin location of the next parcel to be delivered to external device 25 for easy identification by delivery person 23 of the bin 27 in which the parcel to be delivered is located upon arrival at the delivery location. Additionally or alternatively, controller 65 may be communicatively coupled to one or more visual indicators 71 associated with each bin 27 for identification by delivery person 23 of the bin where the parcel to be delivered is located. In some embodiments, controller 65 activates one or more visual indicators 71 associated with the bin or bins 27 in which the parcel to be delivered is located. In other embodiments, visual indicator 71 is positioned on each shelf 31 of bins 27 and controller 65 activates one or more visual indicators 71 associated with the shelf or shelves 31 on which the parcel to be delivered is located. For example, controller 65 may be configured to illuminate one or more visual indicators 71 green to indicate the location of the parcel to be delivered and any remaining visual indicators 71 may illuminate red to indicate that the parcel to be delivered is not located on that particular bin 27 or shelf 31. In some embodiments, visual indicators 71 comprise an LED light.

Delivery system 10 additionally comprises a GPS transmitter 77 configured to communicate with controller 65 via transmitter and receiver 67. GPS transmitter 77 is configured to send a location of delivery vehicle 11 to controller 65 so controller 65 may position a specified bin of bins 27 at a retrieval positioned prior to arriving at the delivery location of each parcel 29. In some embodiments, GPS transmitter 77 is positioned on delivery vehicle 11. In other embodiments, GPS transmitter 77 may be associated with external device 25.

Figure 11:
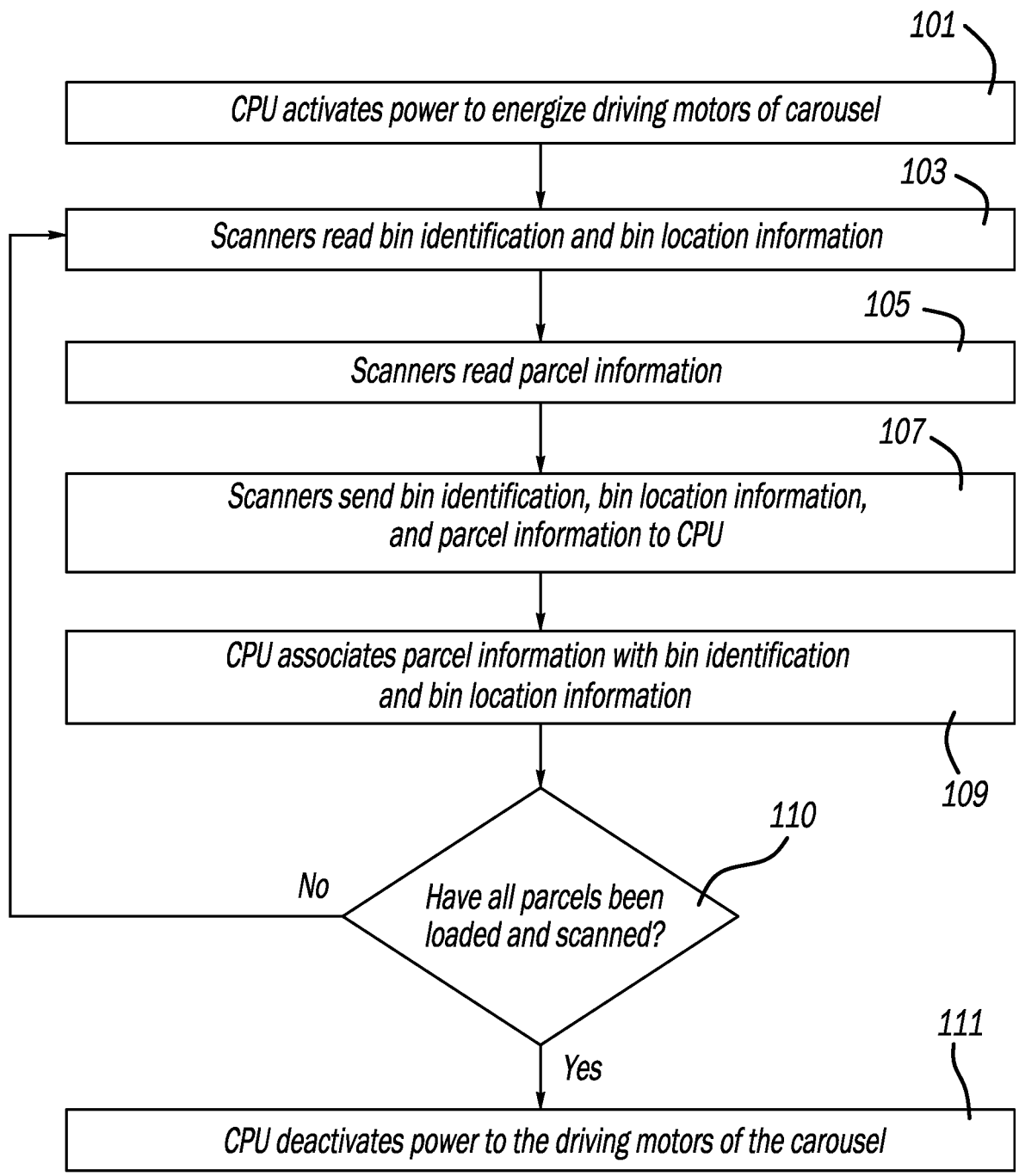
FIG. 11 is a flow diagram showing software logic of a controller employed when loading parcels onto the carousel unit of the present system.

FIG. 11 is a software logic flow diagram illustrating a loading phase that may be associated with some embodiments of delivery system 10. At step 101, the CPU activates power source 73 to energize drive motors 55 and continuously rotate carousel 19. As carousel 19, including bins 27, rotate, parcels 29 are loaded into bins 27, such as through rear access door 15. At step 103, scanners 63 read bin information associated with each bin 27 as carousel 19 rotates and, at step 105, scanners 63 read parcel information associated with each parcel 29 loaded into bins 27 as carousel 19 rotates. At step 107, scanners 63 send the bin information and the parcel information to the CPU. At step 110, controller 65 determines whether all parcels 29 have been loaded onto carousel 19 and scanned by scanners 63. If all parcels 29 have been loaded and scanned, the CPU deactivates power to drive motors 55 at step 111. If not all parcels 29 have been loaded onto carousel 19 and scanned, then controller 65 returns to step 103.

Figure 12:
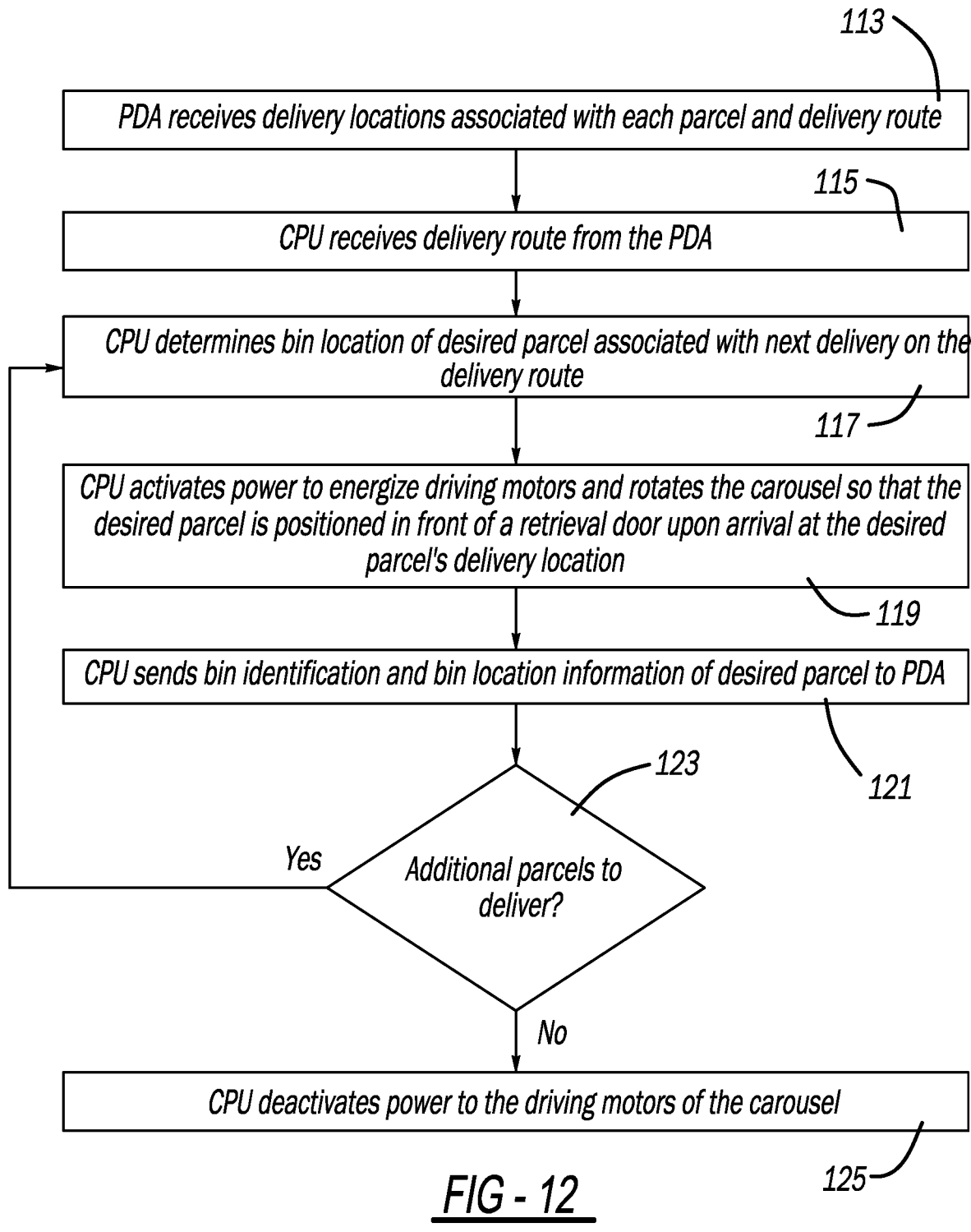
FIG. 12 is a flow diagram showing software logic of the controller employed when delivering parcels along a delivery route in accordance with the present system.

FIG. 12 is a software logic flow diagram illustrating a delivery phase that may be associated with some embodiments of delivery system 10. At step 113, external device 25, such as a PDA, receives a delivery route based on a delivery location associated with each parcel 29 loaded onto carousel 19. In step 115, the CPU receives the delivery route from the PDA. In other embodiments, the CPU may receive the delivery route directly from another external device or system. At step 117, the CPU determines the bin location of a desired parcel associated with the next location on the delivery route. At step 119, the CPU activates power source 73 to energize drive motors 55 and rotate carousel 19 to position bin 27 containing the desired parcel in front of side access door 17 prior to delivery vehicle 11 arriving at the delivery location. At step 121, the CPU sends the bin information associated with the desired parcel to the PDA. For example, the CPU may send the specific bin and/or shelf location in which the desired parcel is located to the PDA. Delivery person 23 may read the information on the PDA to easily identify which bin the desired parcel is located in. Additionally or alternatively, the CPU may activate a visual indicator, such as an LED, associated with the bin containing the desired parcel. At step 123, the CPU determines whether there are additional parcels to be delivered at the delivery location. If there are additional parcels to be delivered, the CPU returns to step 117, if necessary. If there are no additional parcels to be delivered, the CPU deactivates power to drive motor 55 of carousel 19 at step 125. In some embodiments, delivery person 23 scans the desired parcel or parcels to be delivered with an external device or scanner, such as the PDA, to indicate to the CPU that the desired parcel or parcels have been delivered. The CPU may then remove the parcel information associated with the delivered parcel or parcels from the system.

Figure 13:
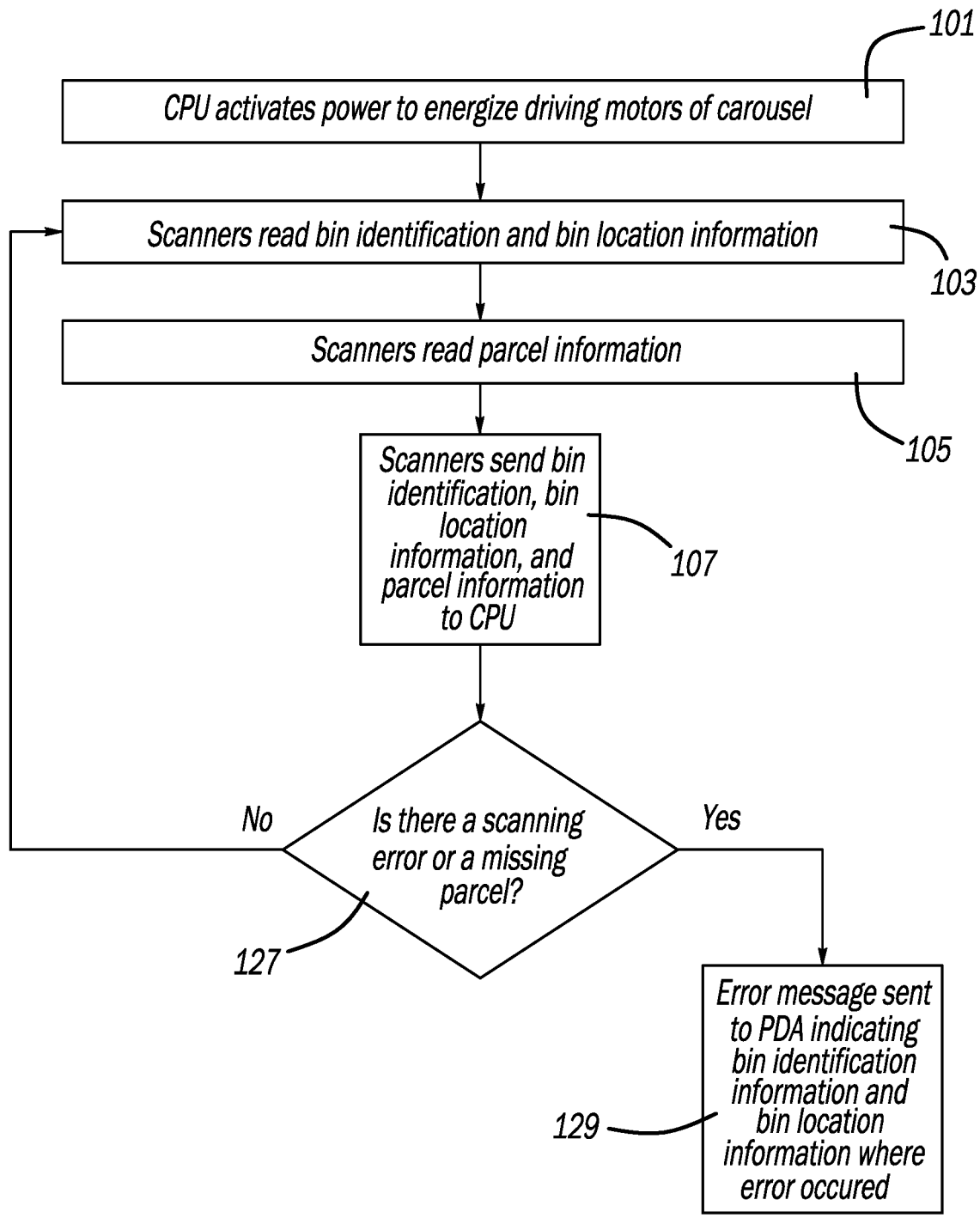
FIG. 13 is a flow diagram showing software logic of the controller employed when a scanning error occurs in accordance with the present system.

FIG. 13 is a software logic flow diagram illustrating additional details that may be associated with some embodiments of delivery system 10. In some embodiments, the CPU may detect a scanning error after scanners 63 send the parcel information to the CPU in step 107 of the loading phase, as discussed with respect to FIG. 11, or during the delivery phase, as discussed with respect to FIG. 12. In step 127, the CPU determines whether a scanning error has occurred. A scanning error may occur, for example, when a barcode associated with a parcel is unreadable, the parcel is positioned in an improper bin, one or more of the bins are overloaded or full, a parcel falls off a shelf or bin, or one of the parcels that was previously scanned is now missing without being marked as delivered. If the CPU determines at step 127 that a scanning error has occurred, an error message is sent to an external device or display, such as external device 25, indicating the bin information associated with the error at step 129. In other embodiments, controller 65 may activate a visual indicator, such as illuminate an indicator light, if a scanning error has occurred. If the CPU determines at step 127 that no scanning error has occurred, the CPU returns to step 103.

Figure 14:
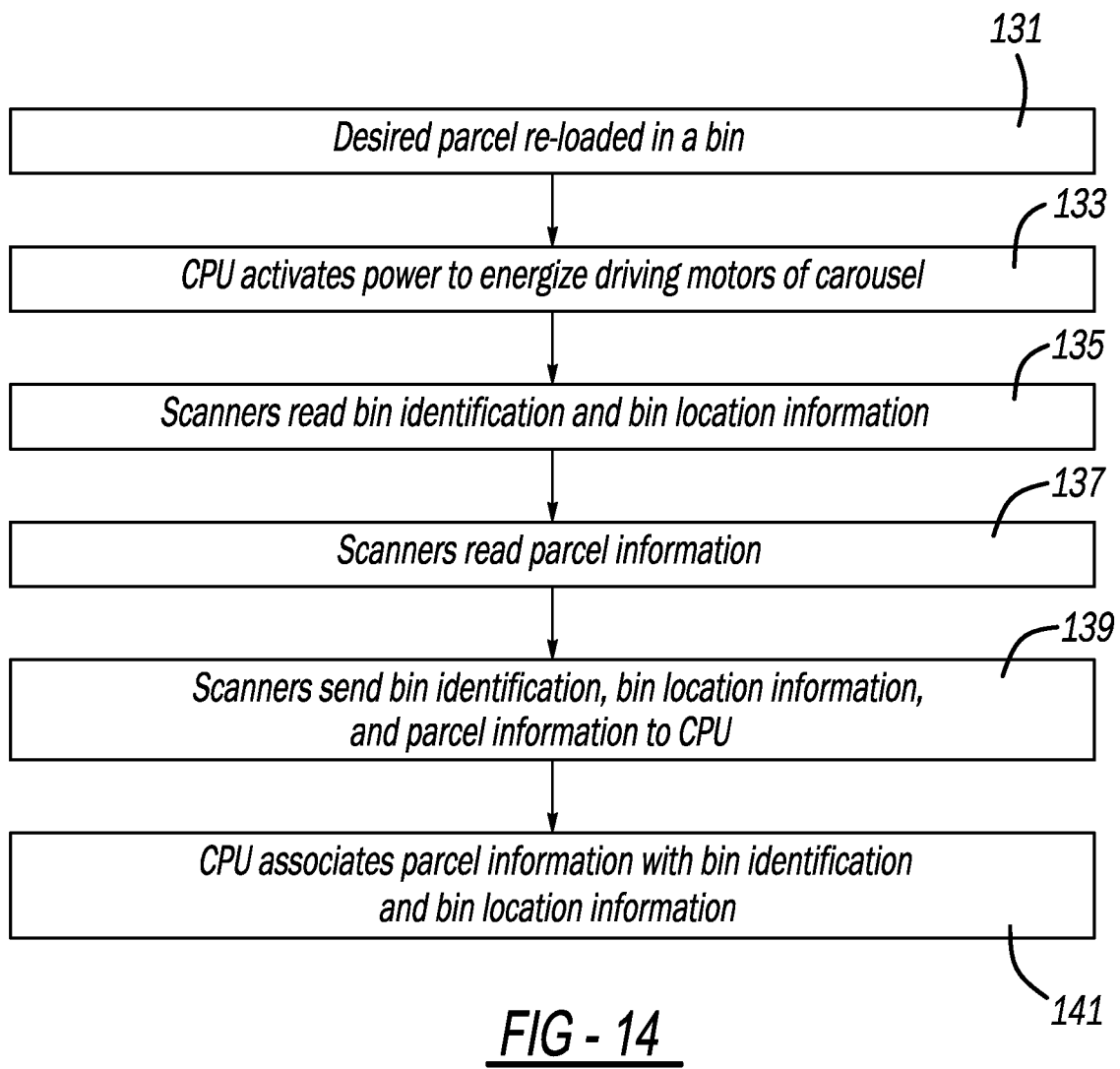
FIG. 14 is a flow diagram showing software logic of the controller employed when a parcel is undeliverable in accordance with the present system.

FIG. 14 is a software logic flow diagram illustrating additional details that may be associated with some embodiments of delivery system 10. In some embodiments, a parcel may be undeliverable. For example, if delivery person 23 is unable to obtain a signature for a parcel that requires such, delivery person 23 may need to return the parcel to carousel 19. At step 131, an undeliverable parcel is re-loaded into an empty bin of bins 27 on carousel 19. The undeliverable parcel does not need to be returned to the same bin that it was retrieved from. At step 133, the CPU activates power source 73 to energize drive motor 55 and rotate carousel 19. At step 135, scanners 63 read bin information. At step 137, scanners 63 read parcel information. At step 139, scanners 63 send the bin information and the parcel information to the CPU. At step 141, the CPU associates the parcel information, including the parcel information of the undeliverable parcel, with the bin information.

Figure 15A:
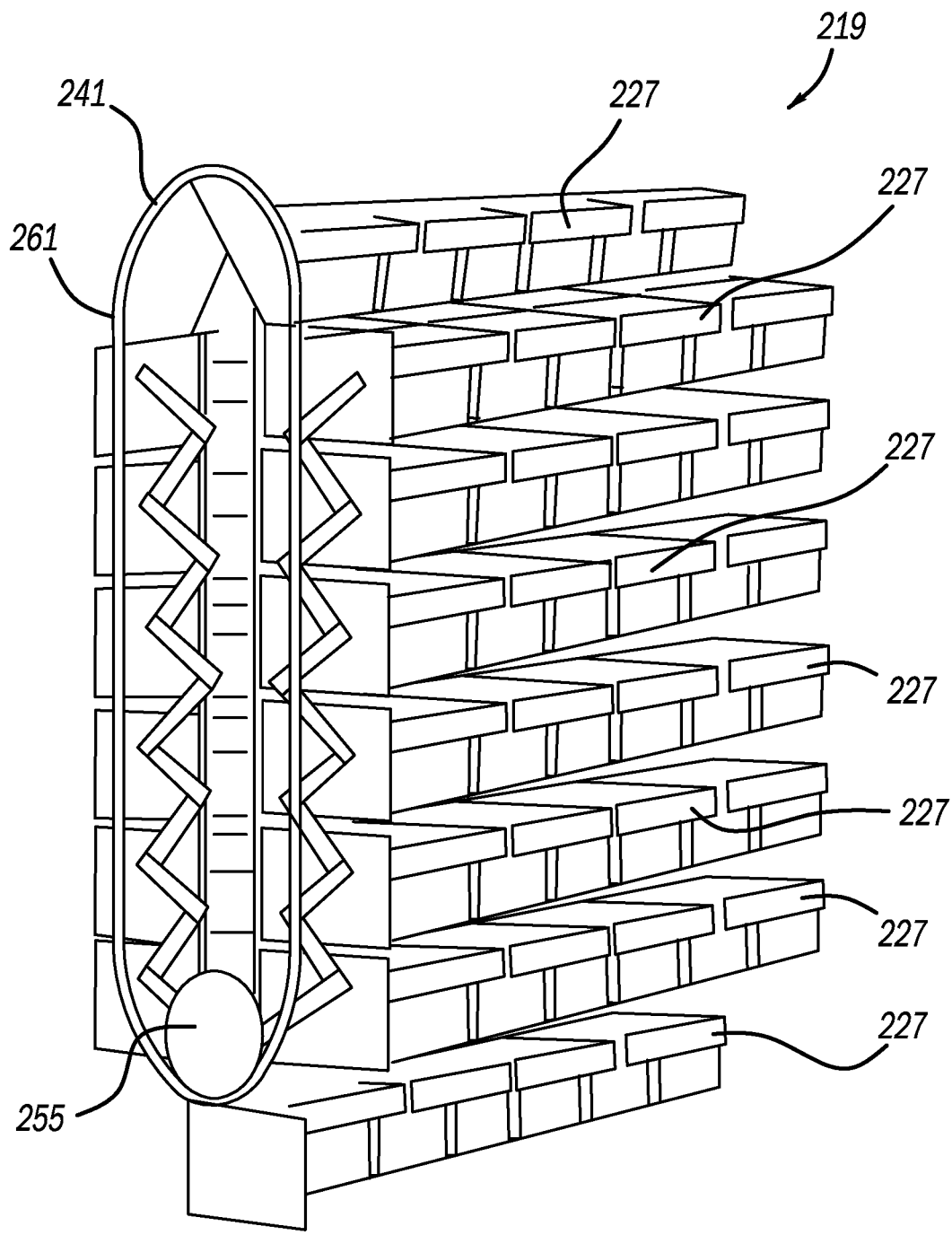
FIG. 15A is a perspective view showing a carousel unit of a second embodiment of the present system.
Figure 15B:
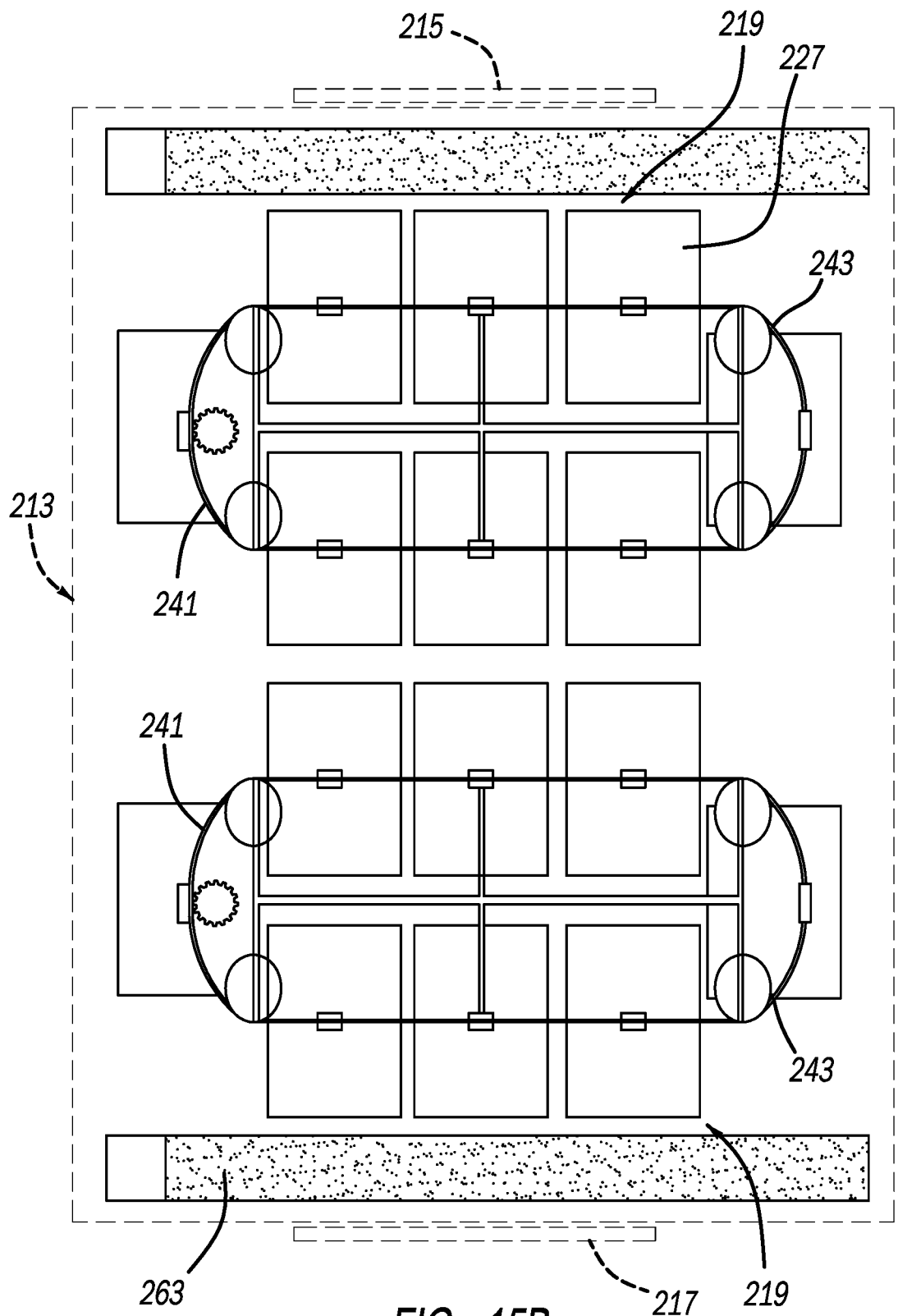
FIG. 15B is a diagrammatic top view of the carousel unit of FIG. 15A inside a box section of a delivery vehicle associated with the second embodiment of the present system.

FIGS. 15A and 15B illustrate example embodiments of a carousel 219 that may be associated with the delivery system 10. Carousel 219 is configured to be positioned within a box section 213 of a delivery vehicle 211 and rotate about a horizontal access. In some embodiments, one or more carousels 219 may be positioned in box section 213, as shown in FIG. 15B. Carousel 219 includes at least a first track 241, a drive belt 261 coupled to the first track 241, and a plurality of bins 227 coupled to drive belt 261 of first track 241. In some embodiments, carousel 219 may also include a second track 243 opposite first track 241, as shown in FIG. 15B. Second track 243 may also include a drive belt 261 to which bins 227 are attached. Additionally, carousel 219 includes at least one drive motor 255 configured to rotate drive belt 261 along at least first track 241 and thereby rotate the bins 227 about first track 241 and second track 243.

With reference to FIG. 15B, box section 213 of delivery vehicle 211 includes a first side door 215 positioned on a first side of box section 213 and a second side door 217 positioned on a second side of box section 213 opposite the first side. For example, first side door 215 and second side door 217 are opposite one another. In some embodiments, at least two carousels 219 are positioned within box section 213. For example, one carousel 219 is positioned adjacent first side door 215 and another carousel 219 is positioned adjacent second side door 217. In such embodiments, one carousel 219 is loaded and unloaded through first side door 215 and another carousel 219 is loaded and unloaded through second side door 217.

Additionally, box section 213 includes one or more scanners 263 configured to scan bins 227 and parcels, such as parcels 29, placed in bins 227. Scanners 263 are configured to be attached to a roof portion of box section 213. For example, one scanner 263 may be mounted to the roof portion of box section 213 adjacent first side door 215 and another scanner 263 may be mounted to the roof portion of box section 213 adjacent second side door 217. In some embodiments, each scanner 263 extends horizontally from a rear portion of box section 213 to a front portion of box section 213.

Figure 16A:
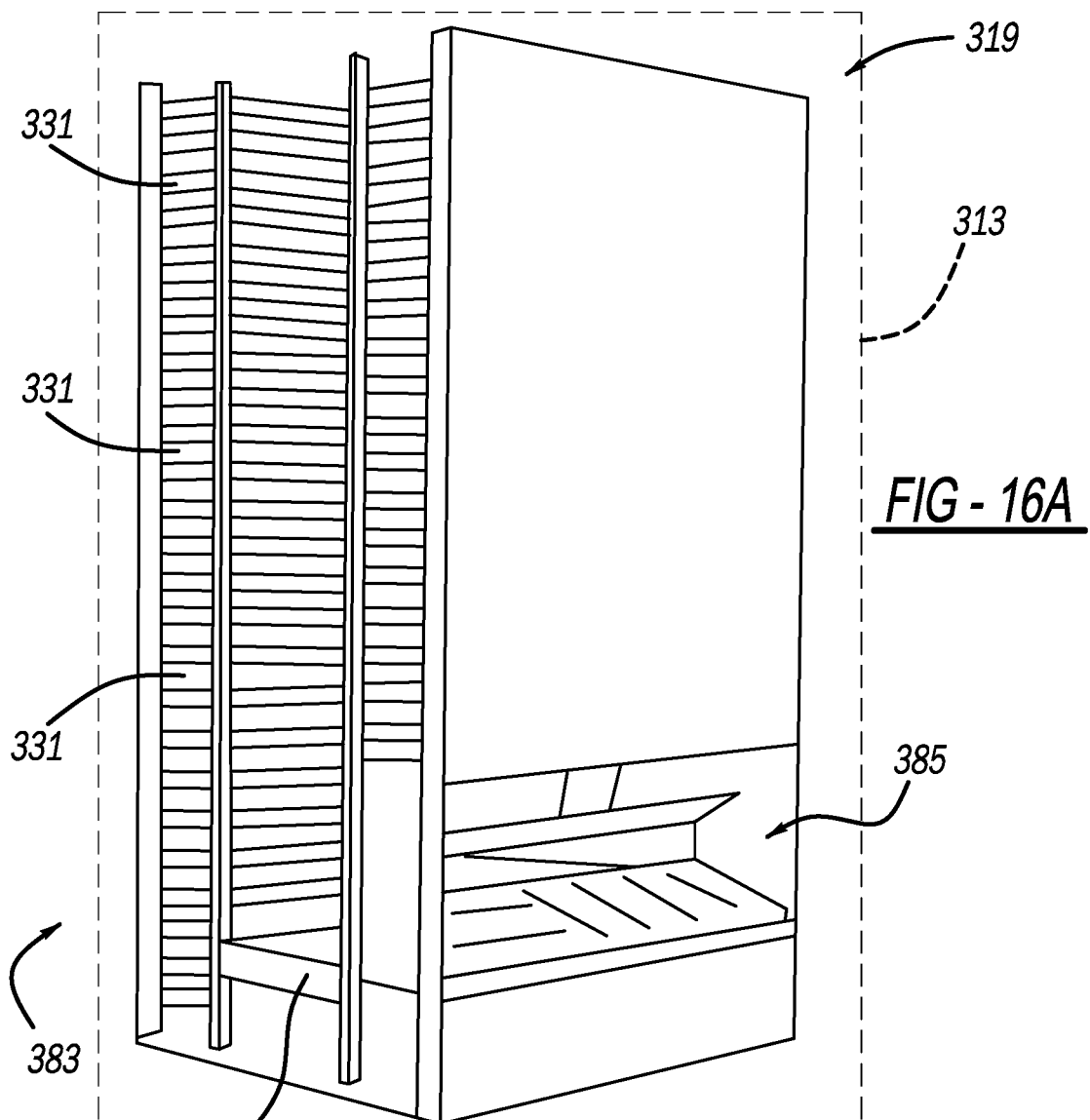
FIG. 16A is a perspective view showing a carousel unit of a third embodiment of the present system.
Figure 16B:
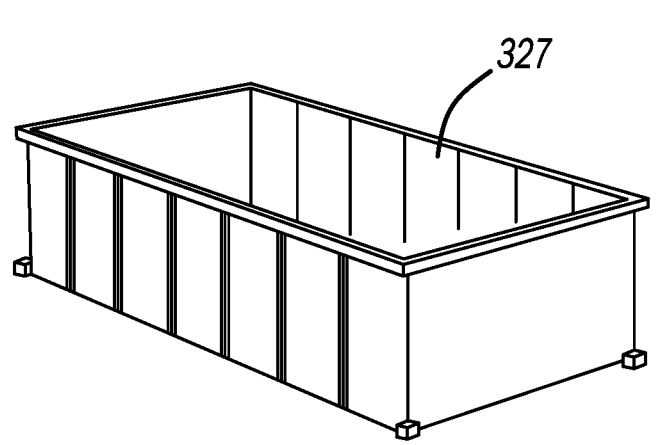
FIG. 16B is a perspective view of a bin associated with the third embodiment carousel unit of the present system.

FIGS. 16A and 16B illustrate example embodiments of a carousel 319 that may be associated with delivery system 10. Carousel 319 may be in the form of a vertical lift module positioned in a box section 313 of a delivery vehicle, such as delivery vehicle 11 in FIG. 1. Carousel 319 includes a plurality of shelves 331 configured to receive and hold a plurality of bins 327, such as bin 327 shown in FIG. 16B. Carousel 319 also includes a moveable tray 381 configured to receive bins 327 and place each bin 327 on one of shelves 331. In some embodiments, moveable tray 381 includes one or more scanners for scanning shelves 331 and bins 327. In some additional embodiments, the scanners may also be configured to scan parcels placed in bins 327.

Additionally, carousel 319 includes a loading section 383 and a retrieval section 385. Carousel 319 is configured to be placed in a box section of a delivery vehicle, such as box section 13 of delivery vehicle 11 shown in FIG. 1. Parcels, such as parcels 29, are loaded on carousel 319 through a rear access door of box section 13 adjacent loading section 383, such as rear access door 15. The parcels are placed in bins 327, and bins 327 are then placed on moveable tray 381 for loading onto shelves 331 of carousel 319. Moveable tray 381 moves and places each bin 327 onto one of the empty shelves 331. In some embodiments, a controller, such as controller 65, activates moveable tray 381 and directs it to move to one of the empty shelves of shelves 331 for placing bin 327. The scanners associated with moveable tray 381 may scan one or more of bin information, shelf information, and parcel information and send the information to the controller. The controller then associates the bin information, shelf information, and parcel information. The controller may also assign each parcel a shelf location.

A desired parcel may be retrieved prior to delivery vehicle 11 arriving at the desired parcel's delivery location. The controller identifies the desired parcel's location on shelves 331 and activates moveable tray 381. Moveable tray 381 retrieves bin 327 containing the desired parcel and delivers it to retrieval section 385. Retrieval section 385 is adjacent a side access door of the box section 13, such as side access door 17 as shown in FIG. 1. A delivery person, such as delivery person 23, may retrieve the desired parcel from retrieval section 385 of carousel 319 through side access door 17.

Figure 17:
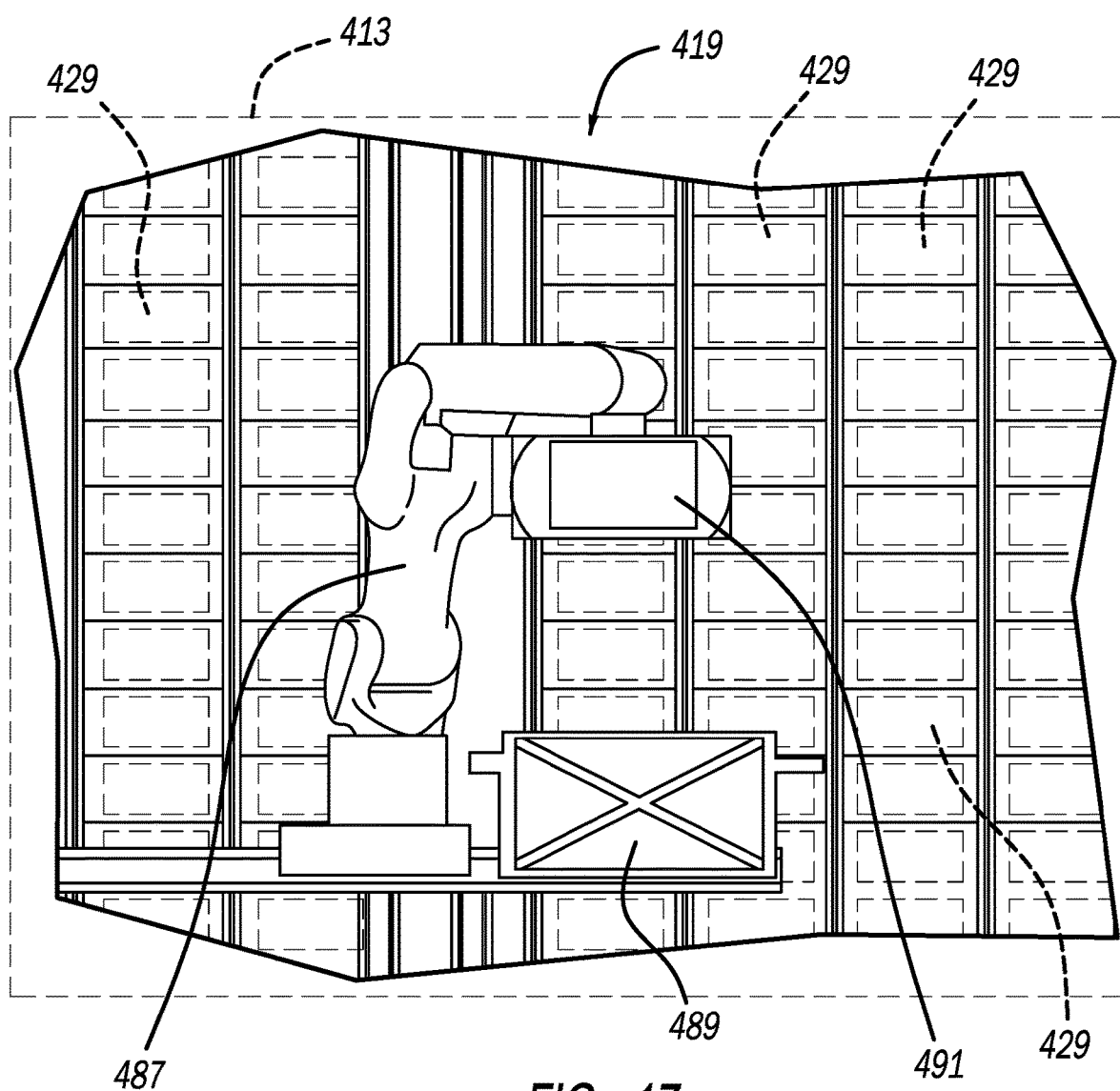
FIG. 17 is a side view of a carousel unit of a fourth embodiment of the present system.

FIG. 17 illustrates example embodiments of a carousel 419 that may be associated with delivery system 10. In some embodiments, carousel 419 may be positioned in a box section 413 of a delivery vehicle, such as delivery vehicle 11 shown in FIG. 1. Carousel 419 includes a plurality of bins 427. A plurality of parcels, such as parcels 429, are loaded into bins 427 by an articulated robot 487. Robot 487 is mounted in box section 413 of delivery vehicle 11 and includes a base, rotating arms upwardly extending from the base, and a gripper at a distal end thereof. In some embodiments, robot 487 includes a transport basket 489. Transport basket 489 is configured to receive each parcel 429 and robot 487 is configured to move transport basket 489 and position transport basket 489 in front of an empty one of bins 427. The parcel within transport basket 489 is then placed in the empty bin 427.

In some embodiments, robot 487 also includes a scanning device 491. Scanning device 491 is configured to scan each bin 427 and each parcel 429 to obtain bin information and parcel information. A controller associated with robot 487 may receive the bin information and the parcel information from scanning device 491 and associate the bin information with the parcel information. In some embodiments, the controller may also assign each parcel 429 a bin location.

A desired parcel for delivery to a specified delivery location may be retrieved prior to delivery vehicle 11 arriving at the specified delivery location. The controller identifies the desired parcel's bin location and activates robot 487. Robot 487 retrieves the bin containing the desired parcel based on the bin location and places the desired parcel in transport basket 489. Robot 487 then moves transport basket 489 to a retrieval position in which a delivery person, such as delivery person 23, may retrieve the desired parcel for delivery. For example, the retrieval position may be one or more side doors in the delivery vehicle, such as side access door 17 in delivery vehicle 11 shown in FIG. 1.

A software program, stored in a non-transient computer memory, comprising a module for identifying parcels on a carousel for delivery at a delivery location is also disclosed. In some embodiments, the carousel is positioned in a cargo box of an automotive vehicle. The module is configured to execute software instructions including a set of instructions receiving an indicia input signal from a sensor, the indicia input signal comprising parcel indicia associated with each parcel, and a set of instructions for associating the parcel indicia with a carousel location. In some embodiments, the sensor comprises an optical scanner position in the cargo box. In other embodiments, the sensor comprises an RFID scanner position in the cargo box.

Additionally, the software instructions include a set of instructions for receiving a delivery route based on the delivery location associated with each parcel from an external source, a set of instructions for identifying the carousel location of a parcel to be delivered along the delivery route, and a set of instructions for activating a driving motor of the carousel to position the parcel to be delivered in a retrieval position prior to arriving at the delivery location. In some embodiments, the software program additionally includes a set of instructions for displaying the carousel location of the parcel to be delivered on an external device. In other embodiments, the software program includes a set of instructions for activating one or more visual indicators indicating the carousel location of the parcel to be delivered.

A method for operating a delivery apparatus for delivery parcels to a specified delivery location is also described. The method includes loading parcels into a plurality of storage bins of a rotatable carousel configured to be positioned in a delivery vehicle. In some embodiments, the method includes scanning each parcel with an external device prior to loading the parcels into the storage bins. The method also includes reading bin identification information associated with each storage bin and reading parcel information associated with each parcel loaded into the storage bins as the carousel rotates. Additionally, the method includes associating the parcel information with the bin identification information, assigning a bin location on the carousel to each parcel, identifying the bin location of a parcel to be delivered along a delivery route, and rotating the carousel to position the parcel to be delivered in front of a retrieval door prior to the delivery vehicle arriving at the parcel's delivery location. In some embodiments, the method includes retrieving the parcel to be delivered from the storage bin and scanning the parcel to be delivered with an external device prior to delivery. In such embodiments, the method may further include sending the bin location of the parcel to be delivered to a display on the external device prior to retrieving the parcel and scanning the parcel.

In some additional embodiments, the method includes receiving a scanning error indicating that a parcel is missing or unreadable and sending the bin information and the bin location of the storage bin associated with the error to a controller. Additionally, the method may include sending the bin information and the bin location of the storage bin associated with the error to an external device.

In still some additional embodiments, the method includes loading an undeliverable parcel into one of the storage bins. Additionally, the method includes reading bin information and parcel information associated with the undeliverable parcel and associating the bin information with the parcel information of the undeliverable parcel. The method may additionally include assigning a bin location to the undeliverable parcel.

While various embodiments of the present invention have been disclosed, it should also be appreciated that other variations may be employed. While delivery of parcels is described herein, it should be appreciated that other items may also be delivered. For example, delivery of grocery, postal, medical, floral, restaurant, retail, plumbing, electrical, contractor, and dry cleaning items may also be employed. Furthermore, a delivery vehicle with a driver and delivery person is disclosed, however, the mobile carousel system can alternately be employed in an autonomous vehicle. It should also be appreciated that any of the preceding embodiments and features thereof can be mixed and matched with any of the others in any combination depending upon the final product and processing characteristics desired. Variations are not to be regarded as a departure from the present disclosure, and all such modifications are intended to be included within the scope and spirit of the present invention.

The invention claimed is:

1. A mobile delivery apparatus for delivering parcels to specified delivery locations, the delivery apparatus comprising:
    (a) a delivery vehicle comprising:
        (i) a motor operably driving terrestrial wheels; and
        (ii) a cargo box section;
    (b) a carousel configured to be positioned in the box section, the carousel comprising storage bins positioned on the carousel and configured to hold the parcels;
    (c) a first access door positioned at a rear portion of the box section through which the parcels are loaded and unloaded to the storage bins;
    (d) at least a second access door positioned at a side portion of the box section through which the parcels are loaded and unloaded to the storage bins;
    (e) at least one scanner affixed to the box section and being positioned adjacent the first access door, the at least one scanner configured to scan the parcels in the storage bins as the carousel rotates the storage bins; and
    (f) a controller configured to rotate the carousel, selectively stop rotation of the carousel, and align one or more of the storage bins with the second access door, wherein the controller is configured to receive data from the at least one scanner, the data comprising parcel indicia and bin indicia.

2. The delivery apparatus of claim 1, wherein:
each storage bin comprises a plurality of shelves;
each shelf comprises a lip on an end of the shelf to deter the parcels from falling off the shelf; and
each shelf is configured to hold up to about 100 pounds.

3. The delivery apparatus of claim 1, wherein the controller includes a software program, stored in a non-transient computer memory, the software program comprising:
a set of instructions receiving an indicia input signal from the scanner, the indicia input signal comprising parcel indicia associated with each of the parcels;
a set of instructions associating the parcel indicia with a carousel location;
a set of instructions receiving a delivery route based on the delivery locations associated with each of the parcels from an external source;
a set of instructions identifying the carousel location of at least one of the parcels to be delivered along the delivery route; and
a set of instructions activating a driving motor of the carousel to position the at least one of the parcels to be delivered in a retrieval position prior to arriving at least one of the delivery locations.

4. The delivery apparatus of claim 1, wherein the controller is configured to associate the parcel indicia and the bin indicia and assign each parcel a bin location on the carousel.

5. The delivery apparatus of claim 1, wherein the at least one scanner comprises multiple spaced apart optical scanners.

6. The delivery apparatus of claim 5, wherein a first of the scanners is positioned in the box section adjacent the first access door and in a first corner of the box section, and a second of the scanners is positioned in a different second corner of the box section with the first access door between the first and the second scanners.

7. The delivery apparatus of claim 1, wherein the at least one scanner is vertically elongated and substantially extends from a roof to a floor of the box section, the scanner being an optical or RFID scanner.

8. The delivery apparatus of claim 1, wherein the delivery vehicle further comprises a passenger cabin, and the storage bins are polymeric or wish mesh with a parcel-holding lip.

9. The delivery apparatus of claim 1, wherein the storage bins comprise at least 8 spaced apart storage bins wherein each of the storage bins is rotatable around a track radius of the carousel while an adjacent of the storage bins is linearly moving along a straight track portion of the carousel.

10. The delivery apparatus of claim 1, wherein each storage bin comprises at least 3 vertically spaced apart shelves configured to hold differently sized ones of the parcels, with an indicia on each parcel outwardly facing so the at least one scanner reads the indicia as it moves past on the carousel.

11. The delivery apparatus of claim 1, wherein the controller on the vehicle is further configured to selectively stop rotation of the carousel and align one or more of the storage bins containing one or more of the parcels to be delivered with the second access door prior to arriving at a specified delivery location of the one or more of the parcels to be delivered, and the controller on the vehicle communicates with a warehouse depot controller and a hand-held and portable PDA.

12. The delivery apparatus of claim 1, further comprising:
a first set of dampeners positioned between the carousel and a roof of the box section; and
a second set of dampeners positioned between the carousel and a floor of the box section;
wherein at least one of the dampeners is a spring dampener or a hydro-elastic dampener.

13. The delivery apparatus of claim 1, further comprising an external device configured to receive instruction from and send instruction to the controller.

14. The delivery apparatus of claim 1, further comprising a sensor positioned adjacent the second access door, the sensor configured to sense when a parcel is removed from one of the storage bins through the second access door.

15. The delivery apparatus of claim 1, further comprising a position switch adjacent the second access door and configured to monitor the position of the storage bins of the carousel.

16. A mobile delivery apparatus comprising:
a carousel configured to rotate a plurality of storage bins about a vertical axis, the storage bins being configured to hold a plurality of parcels; and
a vehicle-mounted controller configured to:
(a) receive parcel information and bin information associated with the storage bins and parcels of the carousel,
(b) assign each parcel a bin location on the carousel based on the parcel information and the bin information,
(c) receive a delivery location associated with each parcel,
(d) receive a delivery route,
(e) rotate the carousel,
(f) determine the bin location of a specified parcel along the delivery route, and
(g) stop rotation of the carousel and position one of the storage bins holding the specified parcel at a retrieval position based on the bin location prior to arriving at the delivery location of the specified parcel; and
a warehouse depot controller and a delivery person-held PDA, both communicating with the vehicle-mounted controller.

17. The mobile delivery apparatus of claim 16, further comprising a visual indicator positioned on each of the storage bins.

18. The mobile delivery apparatus of claim 17, wherein the vehicle-mounted controller is further configured to activate the visual indicator associated with the storage bin holding the specified parcel.

19. The mobile delivery apparatus of claim 16, wherein the vehicle-mounted controller is further configured to send the bin location of the specified parcel to the warehouse depot controller upon arrival at the delivery location of the specified parcel.

20. The mobile delivery apparatus of claim 16, wherein the vehicle-mounted controller is configured to continuously rotate the carousel as the parcels are loaded into the storage bins through a different vehicular door than an unloading vehicular door.

21. The mobile delivery apparatus of claim 16, further comprising an undeliverable phase wherein:
an undeliverable parcel is returned to an empty storage bin; and
the vehicle-mounted controller is configured to receive the parcel information and the bin information associated with the undeliverable parcel and assign a new bin location to the undeliverable parcel.

22. A mobile delivery apparatus comprising:
storage bins configured to hold articles;
an upper track configured to support a top portion of the storage bins;
a lower track configured to support a bottom portion of the storage bins;
a DC drive motor configured to rotate the storage bins between the tracks;
a frame to which the tracks are coupled;
a first set of dampeners positioned on an upper portion of the frame;
a second set of dampeners positioned on a lower portion of the frame;
the storage bins comprise a plurality of adjustable shelves;
a first vertically elongated scanner located adjacent to a vehicular door, scanning parcel indicia of the articles as the storage bins rotate;
a second scanner operably scanning bin indicia; and
a vehicle-mounted controller receiving the scanned article indicia and the scanned bin indicia which the controller then uses to cause the bins to rotate to a desired article retrieval position aligned with a vehicular access door.

23. The mobile delivery apparatus of claim 22, wherein the controller receives a delivery route and determines a storage bin location of a specified article to be delivered.

24. The mobile delivery apparatus of claim 22, wherein each of the adjustable shelves comprise a lip on an end of shelf to deter articles from falling off the shelf, and the shelves are polymeric or wire mesh.

25. The mobile delivery apparatus of claim 22, further comprising a controller configured to send instruction to and receive instructions from at least one external source and rotate the storage bins along the first track and the second track.

26. The mobile delivery apparatus of claim 22, wherein the at least one scanner includes an optical or RFID scanner.

27. The mobile delivery apparatus of claim 22, wherein the DC drive motor is coupled to the second track.

28. The mobile delivery apparatus of claim 22, wherein the DC drive motor comprises a first DC drive motor coupled to the first track and a second DC drive motor coupled to the second track.

29. The mobile delivery apparatus of claim 22, further comprising a cargo box of an automotive vehicle, the first set of dampeners and the second set of dampeners each comprising a spring which is located between the frame and an adjacent interior surface of the cargo box.

30. The mobile delivery apparatus of claim 22, further comprising a cargo box of an automotive vehicle, the first set of dampeners and the second set of dampeners each comprising a hydro-elastic dampener located between the frame and an adjacent interior surface of the cargo box.

31. A software program, stored in a non-transient computer memory, comprising a module for identifying parcels on a carousel for delivery at a delivery location, the module configured to execute instructions comprising:
a set of instructions receiving an indicia input signal from a sensor, the indicia input signal comprising parcel indicia associated with each parcel;
a set of instructions associating the parcel indicia with a carousel location;
a set of instructions receiving a delivery route based on the delivery location associated with each parcel from an external source;
a set of instructions identifying the carousel location of a parcel to be delivered along the delivery route; and
a set of instructions activating a driving motor of the carousel to position the parcel to be delivered in a retrieval position prior to arriving at the delivery location.

32. The software program of claim 31, further comprising a set of instructions displaying the carousel location of the parcel to be delivered on an external device.

33. The software program of claim 31, further comprising a set of instructions activating a visual indicator indicating the carousel location of the parcel to be delivered.

34. The software program of claim 31, wherein the carousel is positioned in a cargo box of an automotive vehicle, and wherein the sensor comprises an optical scanner positioned in the cargo box.

35. The software program of claim 31, wherein the carousel is positioned in a cargo box of an automotive vehicle, and wherein the sensor comprises an RFID scanner position in the cargo box.

36. A method comprising:
loading parcels into a plurality of storage bins of a rotatable carousel configured to be positioned in a delivery vehicle;
reading bin identification information associated with each storage bin as the carousel rotates;
reading parcel information associated with each parcel loaded into the storage bins as the carousel rotates;
associating the parcel information with the bin identification information;
assigning a bin location on the carousel to each parcel;
identifying the bin location of a parcel to be delivered along a delivery route; and
rotating the carousel to position the parcel to be delivered in front of a retrieval door prior to the delivery vehicle arriving at the parcel's delivery location.

37. The method of claim 36, further comprising:
receiving a scanning error indicating that a parcel is missing or unreadable; and
sending the bin identification information and the bin location of the storage bin associated with the error to a controller.

38. The method of claim 37, further comprising sending the bin identification information and the bin location of the storage bin associated with the error to an external device.

39. The method of claim 36, further comprising:
retrieving the parcel to be delivered from the storage bin; and
scanning the parcel to be delivered with an external device prior to delivery.

40. The method of claim 39, further comprising sending the bin location of the parcel to be delivered to a display on the external device prior to retrieving the parcel and scanning the parcel.

41. The method of claim 36, further comprising:
loading an undeliverable parcel into one of the storage bins;
reading bin identification information and parcel information associated with the undeliverable parcel;
associating the bin identification information with the parcel information of the undeliverable parcel; and
assigning a bin location to the undeliverable parcel.

42. The method of claim 36, further comprising scanning each parcel with an external device prior to loading the parcels into the storage bins.

* * * * *